US012561116B2

(12) United States Patent
Fox et al.

(10) Patent No.: US 12,561,116 B2
(45) Date of Patent: *Feb. 24, 2026

(54) DEVELOPER TOOLS FOR GENERATING AND PROVIDING VISUALIZATIONS FOR DATA DENSITY FOR DEVELOPING COMPUTER APPLICATIONS

(71) Applicant: Chime Financial, Inc., San Francisco, CA (US)

(72) Inventors: Jason Fox, San Francisco, CA (US); Ben Snyder, Royal Oak, MI (US); Harold Kim, Seattle, WA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,297

(22) Filed: May 6, 2024

(65) Prior Publication Data

US 2024/0361990 A1 Oct. 31, 2024

Related U.S. Application Data

(63) Continuation of application No. 17/578,819, filed on Jan. 19, 2022, now Pat. No. 11,977,857.

(51) Int. Cl.
*G06F 9/44* (2018.01)
*G06F 8/20* (2018.01)
(Continued)

(52) U.S. Cl.
CPC ............... *G06F 8/20* (2013.01); *G06F 9/451* (2018.02)

(58) Field of Classification Search
CPC .................................... G06F 9/451; G06F 8/20
See application file for complete search history.

(56) References Cited

U.S. PATENT DOCUMENTS 9,098,288 B1 * 8/2015 Rodriguez ................ G06F 8/33
10,430,764 B2 10/2019 Aftab
(Continued)

FOREIGN PATENT DOCUMENTS

CN 110780968 A * 2/2020 ............. G06F 9/451
JP 2019-197527 A 11/2019

OTHER PUBLICATIONS

Chunggi Lee, GUIComp: A GUI Design Assistant with Real-Time, Multi-Faceted Feedback, 2020, pp. 1-13. https://dl.acm.org/doi/pdf/10.1145/3313831.3376327 (Year: 2020).*
(Continued)

*Primary Examiner* — Mongbao Nguyen
(74) *Attorney, Agent, or Firm* — Keller Preece PLLC

(57) ABSTRACT

This application relates to one or more embodiments of methods, non-transitory computer-readable media, and systems provide developer tools for generating and providing visualizations of data densities for various portions of a computer application. For example, the systems can determine a data density that reflects a ratio or an amount of data presented within a (portion of a) display window relative to the entire (portion of the) display window. The systems can further provide a visual representation of a data density for display on a client device, along with indications or suggestions for how to improve (e.g., reduce or increase) the data density for better comprehensibility (e.g., upon distribution of the application). In certain embodiments, the systems can generate suggestions based on an application type of a computer application in development and/or based on a function associated with a particular (portion of a) display window.

20 Claims, 17 Drawing Sheets

(51) Int. Cl.

| | |
|---|---|
| *G06F 9/445* | (2018.01) |
| *G06F 9/45* | (2006.01) |
| *G06F 9/451* | (2018.01) |
| *G06F 9/455* | (2018.01) |

(56) References Cited

U.S. PATENT DOCUMENTS

| | | | |
|---|---|---|---|
| 10,631,050 B2 * | 4/2020 | Fransen | H04N 21/4667 |
| 11,334,223 B1 | 5/2022 | Leo John et al. | |
| 11,537,363 B2 | 12/2022 | Schoppe et al. | |
| 11,868,790 B2 * | 1/2024 | Sollami | G06V 10/774 |
| 2015/0199420 A1 | 7/2015 | Hansen | |
| 2015/0296046 A1 | 10/2015 | Adams et al. | |
| 2016/0085430 A1 | 3/2016 | Moran et al. | |
| 2016/0142513 A1 * | 5/2016 | Uchiumi | H04L 41/082 |
| | | | 717/172 |
| 2017/0123956 A1 | 5/2017 | Lindo et al. | |
| 2018/0095666 A1 | 4/2018 | McKenney | |
| 2018/0210929 A1 * | 7/2018 | Mukherjee | G06F 16/26 |
| 2020/0074104 A1 * | 3/2020 | Sommerville | G06F 21/6227 |
| 2021/0042638 A1 | 2/2021 | Novotny | |
| 2021/0240452 A1 * | 8/2021 | Schoppe | G06F 16/9577 |
| 2021/0342042 A1 * | 11/2021 | Singh | H04L 67/133 |
| 2022/0107847 A1 * | 4/2022 | Shaffer | G06N 3/04 |
| 2022/0197484 A1 * | 6/2022 | Neuberger, Jr. | G06F 3/04845 |
| 2022/0300836 A1 | 9/2022 | Rossi et al. | |
| 2022/0318262 A1 | 10/2022 | Whilden et al. | |
| 2022/0334709 A1 * | 10/2022 | Li | G06F 3/04855 |
| 2022/0334837 A1 | 10/2022 | Sa et al. | |
| 2023/0004673 A1 | 1/2023 | Huang et al. | |
| 2023/0041906 A1 | 2/2023 | Haile | |
| 2023/0206610 A1 * | 6/2023 | Pyzow | G06V 10/776 |
| | | | 382/157 |

OTHER PUBLICATIONS

English translation, GE (CN 110780968 A), 2020, pp. 1-24. (Year: 2020).*

Xi Chen, Composition and Configuration Patterns in Multiple-View Visualizations, 2021, pp. 1514-1521. https://ieeexplore.ieee.org/stamp/stamp.jsp?tp=&arnumber=9222323 (Year: 2021).*

Lewis Chou, 9 Data Visualization Tools That You Cannot Miss in 2021, pp. 1-23. https://towardsdatascience.com/9-data-visualization-tools-that-you-cannot-miss-in-2019-3ff23222a927 (Year: 2021).

Alma Cantu, Identifying the Relationships Between the Visualization Context and Representation, 2017, pp. 1-9. https://ieeexplore.jeee.orq/stamp/stamp.isp?to=&arnumber=8107943 Year: 2017).

Fabian Sperrle, VIANA: Visual Interactive Annotation of Argumentation, 2019, pp. 1-12. https://arxiv.org/pdf/1907.12413.pdf (Year: 2019).

U.S. Appl. No. 17/578,819, Jun. 8, 2023, Office Action.

U.S. Appl. No. 17/578,819, Sep. 20, 2023, Office Action.

U.S. Appl. No. 17/578,819, Jan. 4, 2024, Notice of Allowance.

* cited by examiner

900

Detecting A Portion Area For A Portion Of A Display Window _902_

Determining A Data Area Occupied By Data Elements _904_

Determining A Data Density For The Portion Of The Display Window _906_

Providing A Visual Representation Of The Data Density For Display _908_

1100

DEVELOPER TOOLS FOR GENERATING AND PROVIDING VISUALIZATIONS FOR DATA DENSITY FOR DEVELOPING COMPUTER APPLICATIONS

CROSS-REFERENCE TO RELATED APPLICATIONS

The present application is a continuation of U.S. application Ser. No. 17/578,819, filed on Jan. 19, 2022. The aforementioned application is hereby incorporated by reference in its entirety.

BACKGROUND

Recent developments in the computer application design space have led to improvements in developer tools for creating and editing computer applications in mobile settings, web interfaces, and other modalities. For example, the proliferation of mobile devices has resulted in an increased emphasis on designing mobile applications for myriad tasks including social media, photography, online shopping, mobile investing, and online banking. Indeed, engineers and researchers have developed a variety of application development systems that can facilitate generating or creating mobile applications (or non-mobile applications) by adding, removing, and modifying various display windows that include information such as text, images, links, or graphics. Despite these recent advances, however, conventional application development systems continue to exhibit a number of drawbacks or deficiencies.

For example, some conventional application development systems are inaccurate. To elaborate, existing systems often provide inaccurate guidance (or fail to provide guidance entirely) to developers for how to modify display windows or other aspects of a computer application to improve usability. Indeed, many conventional systems lack proper consideration for measuring or indicating the impact of digital content added to an interface when creating or arranging a computer application. Instead, many conventional systems are generally uninformative, neglecting to provide insight as to how certain (amounts of) digital content affects a user's ability to comprehend and use an application. Consequently, conventional systems often generate cluttered computer applications that are difficult to use and understand.

Due at least in part to their inaccuracy, many conventional application development systems are also slow and inefficient. In particular, conventional systems often require large numbers of client device interactions to generate computer applications. For example, without accurate guidance as to the comprehensibility of various portions of an application, some existing systems require extensive trial and error, generating and distributing many versions of an application before finally ending up with a practicable result. Processing these high numbers of client device interactions (and the repeated generation and distribution of computer applications) is computationally expensive, requiring computing power and memory that could otherwise be preserved. These efficiency issues are especially pronounced when generating mobile applications where screen space is more limited and where comprehensibility issues are more prevalent, which often results in even more user interactions over larger numbers of iterations for improving poorly constructed applications.

Additionally, some existing application development systems are inflexible. For example, many conventional systems are not adaptable to different application types, instead treating the generation of a social media application the same as generating a different type of application such as an online banking application or a calendar application. Indeed, many existing systems take a universal, one size fits all approach to developing applications, providing the same tools within the developer environment irrespective of the end purpose or type of the application being developed. Looking even closer, conventional systems are further incapable of adapting to specific use cases or functions for individual frames or windows within applications, such as differences between a display window for registering a new account within an application and a display window for reviewing terms and conditions associated with registering a new account (within the same application) which may require different parameters than the account registration portion.

These, along with additional problems and issues, exist with conventional application development systems.

SUMMARY

This disclosure describes one or more embodiments of methods, non-transitory computer-readable media, and systems that can solve the foregoing problems in addition to providing other benefits by generating and providing indications of data density for various portions of a computer application. For example, the disclosed systems can provide developer tools to determine a data density that reflects a ratio or an amount of data presented within a (portion of a) display window relative to the entire (portion of the) display window. In some cases, a data density indicates a ratio of text volume relative to a display window, while in other cases a data density indicates a ratio of area occupied by data elements (e.g., text, icons, graphics, or other informative pieces of information) relative to the display window. The disclosed systems can further provide a visual representation of a data density for display on a client device, along with indications or suggestions for how to improve (e.g., reduce or increase) the data density for better readability and/or comprehensibility (e.g., upon distribution of the application). In certain embodiments, the disclosed systems can generate suggestions based on an application type of a computer application in development and/or based on a function associated with a particular (portion of a) display window.

BRIEF DESCRIPTION OF THE DRAWINGS

The detailed description refers to the drawings briefly described below.

DETAILED DESCRIPTION

Figure 1:
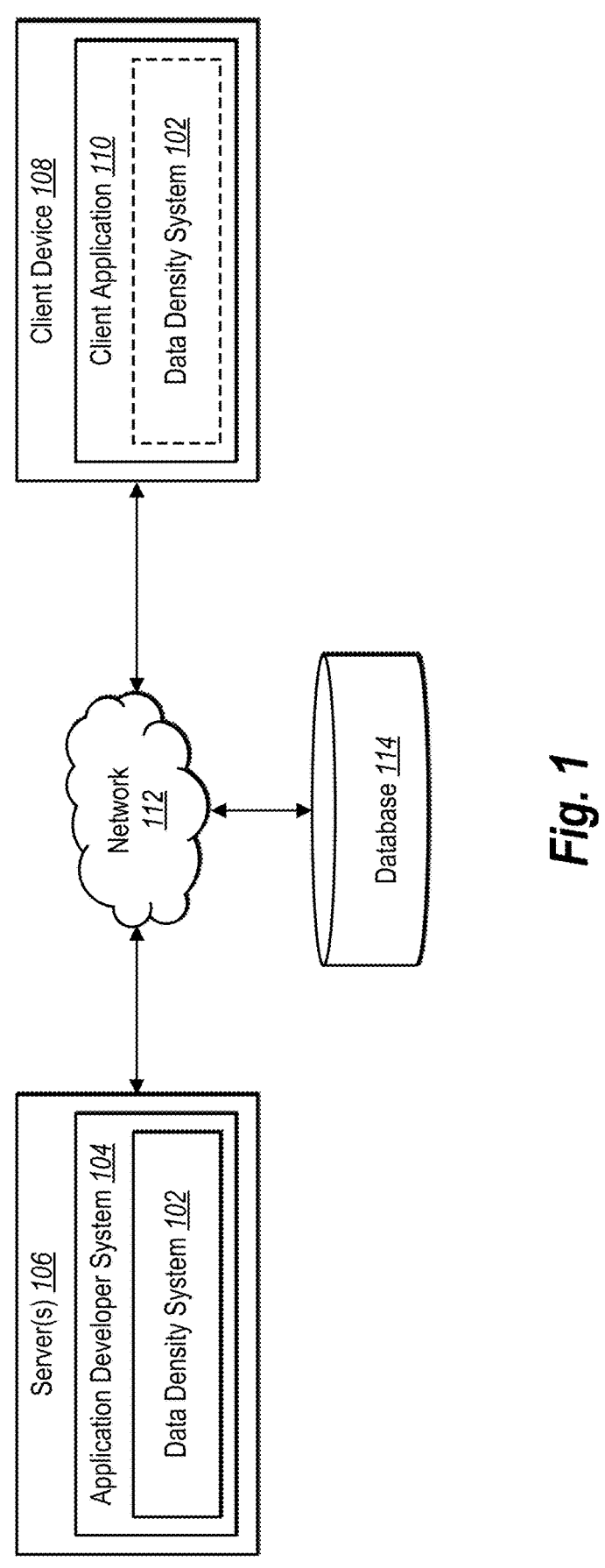
FIG. 1 illustrates a block diagram of an environment for implementing an application developer system and a data density system in accordance with one or more embodiments.

This disclosure describes a data density system that can generate and provide developer tools for determining data density and for generating indications for how to improve data density. In practical scenarios, application developers often design applications so that the information presented in a given display window is easily comprehensible. Oftentimes, display windows that are cluttered with too much information such as large amounts of text (or other data elements) can be difficult to read and/or comprehend. In the case of creating a mobile application, for instance, screen space is at a premium and the margin for error between what is too much text (or other data elements) and what is the right amount is therefore even smaller than for other (non-mobile) applications. To facilitate accurate, efficient, flexible generation of computer applications, the data density system provides developer tools for determining data densities and generating recommendations for how to improve data densities, and further provides visualizations for data densities within a developer application.

As just mentioned, the data density system can determine a data density for a display window (or a portion of a display window). In particular, the data density system can identify an entire display window or a portion of a display window and can further identify one or more data elements presented within the display window (or the portion of the display window). For example, the data density system can segment a display window into different portions (e.g., based on user interaction or automatically based on various factors) and can treat each portion independently, with its own data density, visualizations, and recommendations. In some cases, the data density system can identify data elements such as text, images, icons, or graphics presented within the display window (or the portion of the display window). In some cases, the data density system automatically (e.g., without user interaction selecting or indicating) identifies data elements. In these or other cases, the data density system receives user interaction selecting one or more data elements.

In one or more embodiments, the data density system determines a data density based on text volume. More specifically, the data density system can determine an area occupied by text within a display window (or a portion of a display window) and can further determine an overall area of the display window (or the portion of the display window). The data density system can further compare the text area and the display window area (or the portion area) to determine a data density in the form of a ratio of text area to overall available display area. Additional detail regarding how text area is determined is provided below with reference to the figures.

In certain embodiments, the data density system determines a data density based on data elements other than (or in addition to) text. In particular, the data density system can determine an area occupied by one or more data elements such as graphics, images, icons or other displayable elements that present information. The data density system can further compare the area of the data elements to the overall area of a display window (or a portion area of a portion of a display window) to determine a data density in the form of ratio of data element area to overall available display area. Additional detail regarding how data element area is determined is provided below with reference to the figures.

As mentioned, the data density system can generate recommendations or suggestions for how to improve data densities for individual display windows (or individual portions of a display window). For example, the data density system can determine one or more data density thresholds that delineate between different levels of data density (e.g., where one level indicates how much is too much data for the space and another level indicates the right amount of data for the space). The data density system can compare a data density of a display window (or a portion of a display window) with one or more data density thresholds to determine whether data should be added, removed, or modified. In some cases, the data density system generates different thresholds and/or different recommendations depending on the type of application (e.g., social media vs. online banking) and/or the function of the display window (e.g., the scenario or context associated with the display window). Additional detail regarding generating the thresholds and the recommendations is provided below with reference to the figures.

As suggested above, the disclosed data density system provides several improvements or advantages over conventional application development systems. For instance, the data density system introduces a novel functionality not found in existing systems. Specifically, the data density system provides developer tools for determining, and generating recommendations based on, a data density for a display window (or a portion of a display window). Unlike prior systems, the data density system can determine a data density for a display window (or a portion of a display window) during or after its development and can further provide a recommendation for how to improve the data density (e.g., by adding, removing, or editing text or other data elements) for better comprehensibility.

At least by utilizing the aforementioned new functionality of determining data density, the data density system can further improve accuracy over conventional systems. While some existing systems provide inaccurate guidance (or else entirely lack the consideration) for how to improve comprehensibility of a computer application, the data density system can accurately determine a data density for a (portion of a) display window that represents a particular page or frame of a computer application. As a result, unlike conventional systems that generally leave developers to their own devices, the data density system provides accurate insight into improving the comprehensibility of (display windows within) a computer application and how to improve it.

Due at least in part to its improved accuracy, embodiments of the data density system can further improve speed and efficiency over conventional application development systems. To elaborate, the data density system can reduce the number of user interactions for generating computer applications compared to prior systems. Indeed, whereas prior systems often require excessive numbers of user interactions to generate and modify digital content many times over to improve comprehensibility through trial and error, the data density system provides tools for quick and efficient insight into comprehensibility for faster development of an application by arranging data elements using fewer user interactions.

Using the data density determinations, the data density system can also eliminate or reduce the repeated generation and distribution of computer applications that is part of the design process for improving comprehensibility in prior systems (instead providing data density indications and improvement recommendations up front). By reducing the number of user interactions for generating computer applications (and the number of generated and distributed iterations of applications), the data density system therefore reduces consumption of computing resources such as processing power and memory compared to existing systems.

Embodiments of the data density system further improve efficiency on the user side. To elaborate, the data density system can generate more efficient, more usable user interfaces compared to prior systems. Indeed, while prior systems often result in clunky user interfaces with either too much or too little data presented in a given interface, the data density system improves the efficiency of user interfaces (and of navigation through the user interfaces) by aiding developers in generating user interfaces that present more comprehensible amounts of data.

In addition, embodiments of the data density system can improve flexibility over conventional application development systems. In particular, while many conventional systems are fixed to a rigid, one size fits all approach to application development and design, the data density system can flexibly adapt to guide application design based on specific application types and/or functions of individual display windows (or portions of display windows). For instance, the data density system can determine an application type for a computer application in development and can customize data density thresholds according to the application type to provide recommendations for adjusting a data density relative to the thresholds (e.g., where higher density may be better for a social media application than for an online banking application). As another example, the data density system can determine a display window function for a display window (or a portion function for a portion of a display window) within an application and can tailor thresholds and modification recommendations according to the function (e.g., where a higher density may be better for a display window for reviewing terms and conditions than for a display window for signing into a user account).

As indicated by the foregoing discussion, the present disclosure utilizes a variety of terms to describe features and advantages of the data density system. For example, as used herein, the term "display window" can refer to a frame or a page of a computer application that is developed or in development. For example, a display window can include a frame presented within a developer application that represents an individual page or user interface of a computer application being developed. Relatedly, a "portion" of a display window can refer to a subregion or a section within a display window. In some embodiments a display window includes multiple portions, where each portion has its own portion function and includes its own data elements. For example, a display window can be arranged hierarchically, including layers for separate portions in a containerized or nested fashion, where one portion resides within another portion which resides within the display window as a whole. Also (or alternatively), a display window can include multiple portions that are arranged within the same layer or level of a hierarchy (e.g., adjacent as opposed to nested) and that include different data elements. In some cases, a portion of a display window can refer to or include an entire display window.

Relatedly, the term "portion function" (or sometimes simply "function") refers to a scenario, a purpose, or a use case associated with a portion of display window. For example, a portion function can include an intended use of, or purpose for, a particular portion of a display window upon release and distribution to client devices. Along these lines, a "display window function" refers to a function, a purpose, or a use case associated with a display window. Example functions for display windows (or portions of display windows) include, but are not limited to, registering for a user account, signing into a user account, reviewing terms and conditions, creating a message, viewing an account balance, or initiating a transfer of funds. In a similar vein, the term "application type" refers to a type, genre, category, or purpose for a computer application as a whole. Particularly, an application type indicates how an application is used by a client device. Example application types include, but are not limited to, social media applications, photography applications, online shopping applications, mobile investing applications, and online banking applications.

As further used herein, the term "data element" can refer to a collection or grouping of pixels that, considered together as a single entity, depict or convey information to a viewer or user. For example, a data element can include digital text, a digital image, an icon, or a graphic displayed within a portion of a display window. In some cases, a data element refers to a single text character or a single icon or a single digital image. In other cases, a data element refers to a grouping of multiple text characters, multiple icons, and/or multiple digital images together. Some visual elements presented within a display window may not qualify, or be considered, as data elements. For example, the data density system distinguishes between visual elements that convey information ("data elements") for a user to comprehend and visual elements that do not convey information ("non-data elements") and that are solely for aesthetics or other purposes. In some embodiments, a data element is the smallest denomination of visualized digital content within a display window, where the data element does not contain any additional visual elements inside it.

As mentioned, in some embodiments, the data density system determines a data density associated with a portion of a display window. As used herein, the term "data density" refers to a measure of data elements relative to a display window or a portion of a display window. For example, a data density can indicate a comparison of a data area occupied by data elements within a portion of a display window and a portion area of the portion of the display window. In some cases, a data density includes a ratio of a combined area of data elements to a total area of a portion of a display window. In certain embodiments, a data density can also (or alternatively) indicate an average data density or an average amount of space occupied per data element (e.g., based on a total number of data elements depicted within a portion of a display window). In some cases, a data density indicates a text volume relative to a portion of a display window and/or a volume of pixels depicting other data elements.

In certain embodiments, the data density system determines a comprehensibility level for a portion of a display window based on its data density. As used herein, the term "comprehensibility level" refers to a measure or degree to which a display window (or a portion of a display window) is comprehensible to a user as displayed by a client device. For example, a comprehensibility level can include a range of data densities that correspond to a particular ease or difficulty of comprehending digital content such as data elements within a portion of a display window. In some cases, the data density system can determine multiple comprehensibility levels based on an application type and/or a portion function of a portion of a display window, where one comprehensibility level indicates easy comprehension and another indicates difficult comprehension. The data density system can further determine a comprehensibility level that corresponds to a portion of a display window based on its individual data density.

Additional detail regarding the data density system will now be provided with reference to the figures. In particular, FIG. 1 illustrates a block diagram of a system environment for implementing a data density system 102 in accordance with one or more embodiments. As shown in FIG. 1, the environment includes server(s) 106 housing the data density system 102 as part of an application developer system 104. The environment of FIG. 1 further includes client device 108, a network 112, and a database 114. The server(s) 106 can include one or more computing devices to implement the data density system 102. Additional description regarding the illustrated computing devices (e.g., the server(s) 106, the client device 108, and/or the database 114) is provided with respect to FIGS. 10-11 below.

As shown, the data density system 102 utilizes the network 112 to communicate with the client device 108, the server(s) 106, and/or the database 114. The network 112 may comprise any network described in relation to FIGS. 10-11. For example, the data density system 102 communicates with the client device 108 to provide and receive information pertaining to developing computer applications (e.g., mobile or non-mobile applications). Indeed, the application developer system 104 or the data density system 102 can receive an indication to determine a data density as part of developing a computer application and can provide information indicating a data density, a comprehensibility level, and/or a recommendation for modifying a data density.

As indicated by FIG. 1, the client device 108 includes the client application 110. In many embodiments, the application developer system 104 or the data density system 102 communicates with the client device 108 through the client application 110 to, for example, receive and provide information for designing and developing computer applications. For instance, the client application 110 can be a developer application for creating and designing pages, frames, user interfaces, and other components of a computer application (e.g., a mobile application or a non-mobile application). In addition, the client application 110 can present or display information received from the data density system 102 or the application developer system 104, such as visual representations of data density, recommendations for modifying data density, and interactive (e.g., user-selectable) tools for selecting portions of display windows, detecting data elements, and determining data density.

As indicated above, the application developer system 104 or the data density system 102 can provide (and/or cause the client device 108 to display or render) visual elements within a graphical user interface associated with the client application 110. For example, the application developer system 104 or the data density system 102 can provide a graphical user interface (for display as part of the client application 110) that includes application design tools such as tools for selecting portions of display windows, detecting data elements, and determining data density, as well as a design region for viewing display windows created and arranged for an application in development.

In one or more embodiments, the server(s) 106 includes all, or a portion of, the data density system 102. For example, the data density system 102 operates on the server(s) 106 to determine and provide visual representations of data densities for display windows (or portions of display windows). In some cases, the data density system 102 utilizes, locally on the server(s) 106 or from another network location (e.g., the database 114), various components of a developer application such as the client application 110.

In particular, in some implementations, the data density system 102 on the server(s) 106 supports the data density system 102 on the client device 108. The data density system 102, via the server(s) 106, provides various components of a developer application (e.g., data density components) to the client device 108. In other words, the client device 108 obtains (e.g., downloads) one or more components for the client application 110 from the server(s) 106. Once downloaded, the data density system 102 on the client device 108 is able to utilize all or part of the client application 110 (locally on the client device 108) to determine data density and perform other methods described herein, independent of the server(s) 106.

In alternative implementations, the data density system 102 on the server(s) 106 includes a web hosting application that allows the client device 108 to interact with content and services hosted on the server(s) 106. To illustrate, in one or more implementations, the client device 108 accesses a web page supported by the server(s) 106 to access data density determination functionality (or other functionality described herein) from the server(s) 106 and to display the results via a display on the client device 108.

Although FIG. 1 illustrates the environment having a particular number and arrangement of components associated with the data density system 102, in some embodiments, the environment may include more or fewer components with varying configurations. For example, in some embodiments, the application developer system 104 or the data density system 102 can communicate directly with the client device 108 and/or the database 114, bypassing the network 112. In these or other embodiments, the application developer system 104 or the data density system 102 can be housed (entirely on in part) on the client device 108. Additionally, the application developer system 104 or the data density system 102 can include (e.g., house) the database 114 or communicate with the database 114 located externally from the server(s) 106 to store information such as data densities, application programming interfaces (APIs), locations for data elements, locations for portions of display windows, and/or other information described herein.

Figure 2:
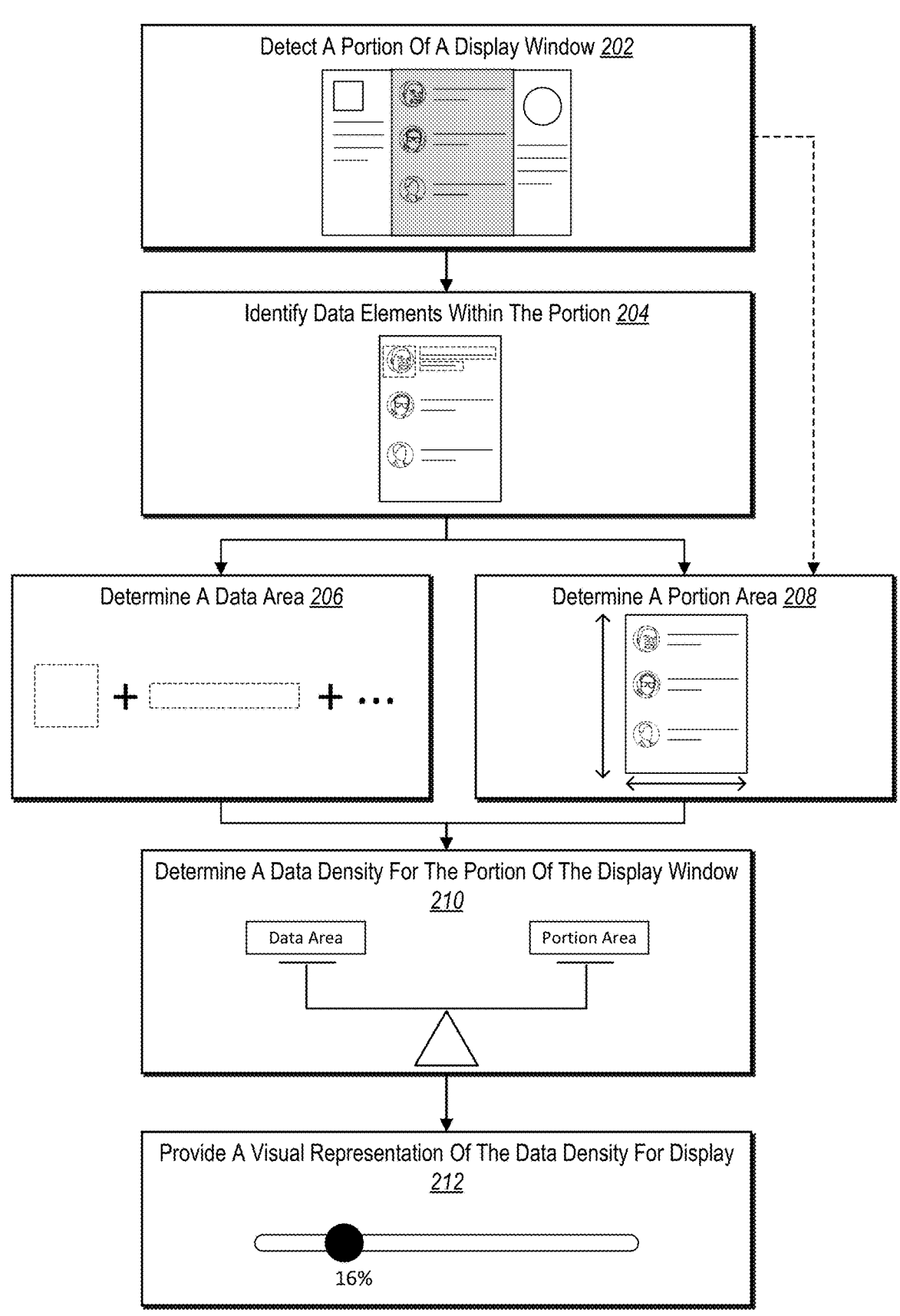
FIG. 2 illustrates an example overview of determining and providing a visualization of a data density in accordance with one or more embodiments.

As mentioned, in certain embodiments, the data density system 102 can determine a data density for a portion of a display window (or for an entire display window). In particular, the data density system 102 can determine a portion area and a data area and can compare them to determine a data density. FIG. 2 illustrates an example overview of determining, and providing a visual representation of, a data density for a portion of a display window in accordance with one or more embodiments. The description of FIG. 2 provides a general overview of acts involved in determining a data density, and additional detail regarding the various acts depicted in FIG. 2 is provided thereafter with reference to subsequent figures.

As illustrated in FIG. 2, the data density system 102 the data density system 102 performs an act 202 to detect a portion of a display window. In particular, the data density system 102 identifies or detects a portion of a display window by identifying a frame, panel, page, or other portion of a graphical user interface displayed on a client device (e.g., as part of the client application 110 on the client device 108). For example, the data density system 102 identifies a display window presented as part of developing or designing a computer application via the client application 110, and the data density system 102 further detects a portion within the display window. In some cases, the data density system 102 receives a user interaction selecting or otherwise indicating the portion of the display window.

In certain embodiments, the data density system 102 automatically (e.g., without user interaction specifically instigating or requesting) identifies a portion of a display window. More specifically, the data density system 102 identifies a portion of a display window by determining a hierarchical relationship between visual elements within the display window. For example, the data density system 102 determines containership or nesting associated with the various visual elements depicted within a display window. Specifically, the data density system 102 determines parent-child relationships between visual elements, where one visual element may reside in, or occupy space of, another visual element. In certain embodiments, the data density system 102 identifies a portion of a display window as a non-data element when the display window includes one or more other visual elements (one or more of which qualifies as a data element). In these or other embodiments, the data density system 102 identifies the portion of the display window as a data element even if the portion includes additional visual elements.

In one or more embodiments, the data density system 102 determines a particular portion of a display window that is currently being (or has most recently been) modified as part of a development process within the client application 110 (e.g., an active or selected portion). In some cases, the data density system 102 queries an API (e.g., a display window structure API) associated with the client application 110 to determine pixel coordinates and/or dimensions associated with a portion of a display window. For instance, the data density system 102 determines coordinate locations of one or more corners of the portion of the display window. As shown, the depicted display window has three separate portions (left, right, and middle), and the data density system 102 detects or selects the middle portion (as indicated by the gray highlighting).

As further illustrated in FIG. 2, the data density system 102 performs an act 204 to identify data elements within the portion of the display window. To elaborate, the data density system 102 identifies or determines data elements that lie within, or occupy area of, the portion of the display window. For example, the data density system 102 identifies data elements such as text or other graphical elements intended to convey meaning. In some cases, the data density system 102 automatically (e.g., without prompting from user input) initiates the detection of data elements (e.g., upon detecting a portion of a display window or for every portion of a display window depicted within a developer application). In certain cases, the data density system 102 receives a user interaction selecting an option or a tool within a developer application to initiate detection of data elements. The data density system can also automatically detect (e.g., without user input specifically defining) visual elements within the portion of the display window and intelligently determine which of the visual elements convey information (excluding those that do not).

In one or more embodiments, the data density system 102 queries a display window structure API to identify or determine pixel coordinates and dimensions associated with respective data elements. In these or other embodiments, the data density system 102 receives one or more user interactions selecting or otherwise indicating data elements within the portion of the display window (e.g., by defining bounding boxes encompassing individual data elements). As shown, the data density system 102 detects a number of elements within the detected or selected portion, such as those indicated by dashed bounding boxes (in addition to others).

As further illustrated in FIG. 2, the data density system 102 performs an act 206 to determine a data area associated with the portion of the display window. More particularly, the data density system 102 determines a data area (e.g., a number of square pixels) corresponding to one or more data elements identified or detected within the portion of the display window. For instance, the data density system 102 determines individual element-specific areas for each respective data element and further combines the element-specific areas to determine the overall data area occupied by the data elements together. In some cases, the data density system 102 queries a display window structure API to determine the dimensions of each data element, and the data density system 102 further determines the data area based on the dimensions of each data element (e.g., width×height).

Additionally, the data density system 102 performs an act 208 to determine a portion area associated with the portion of the display area. To elaborate, the data density system 102 determines an area (e.g., a number of square pixels) that the portion of the display window occupies as part of the display window (e.g., width×height). As mentioned above, the data density system 102 can query a display window structure API to determine the dimensions of the portion. In some embodiments, the data density system 102 determines the portion area based on (or after) initially detecting the portion area of the display window and/or identifying the data elements within the portion. In certain cases, however, the data density system 102 determines the portion area before (or irrespective of) identifying data elements within the portion of the display window.

As further illustrated in FIG. 2, the data density system 102 performs an act 210 to determine a data density for the portion of the display window. To determine the data density, the data density system 102 compares the data area with the portion area. To elaborate, the data density system 102 determines a ratio of the data area to the portion area. For example, the data density system 102 determines a percentage of the data area occupied by the data elements of the portion of the display window to the total portion area occupied by the portion of the display window. In some cases, the data density system 102 determines a data density in response to user interaction selecting a particular option or tool within a developer application. In other cases, the data density system 102 determines a data density automatically, or without user interaction requesting or instigating the determination (e.g., upon detecting a portion of a display window or for every portion of a display window depicted within a developer application).

In certain cases, the data density system 102 determines a different version of a data density (or an additional metric beyond the data density). Specifically, the data density system 102 determines an average data area or an average density occupied by each individual data element within the portion of the display window. For example, the data density system 102 determines a total number of data elements within the portion (ignoring or excluding non-data elements) and determines the average area by dividing the data area into the total number of data elements. As another example, the data density system 102 determines an average data density per data element by dividing the data density into the total number of data elements.

In addition, the data density system 102 performs an act 212 to provide a visual representation of the data density for display. In particular, the data density system 102 provides the visual representation of the data density for display on a client device (e.g., as part of the client application 110 displayed via the client device 108). For example, the data density system 102 generates and provides a visual representation such as a percentage, a pie chart, a gradient, or a sliding scale. As shown, the data density system 102 determines a data density of 16% for the portion of the display window, thus indicating that 16% of the portion area is occupied by data elements, or the data area is 16% of the portion area. The data density system 102 generates, and provides for display, a sliding scale (e.g., from 0 to 100) including a density indicator at 16% corresponding to the portion of the display window.

As mentioned above, in certain described embodiments, the data density system 102 provides developer tools for determining and modifying data densities. In particular, the data density system 102 provides tools within a developer application (e.g., the client application 110) to determine, visualize, and modify a data density associated with a portion of a display window. FIG. 3 illustrates an example developer interface 304 displayed on a client device 302 (e.g., the client device 108) for determining, visualizing, and modifying a data density in accordance with one or more embodiments.

As illustrated in FIG. 3, the data density system 102 generates and provides the developer interface 304 for display on the client device 302. Within the developer interface, the data density system 102 detects or identifies a display window 308 ("Frame 32"). In some cases, the display window 308 is a portion of a larger display window. As shown, the data density system 102 further identifies or detects various data elements 322a-322d within the display window 308. For instance, the data density system 102 receives a user interaction selecting the option 318 to detect text (or detect data elements), whereupon the data density system 102 detects the data elements 322a-322d.

The data density system 102 further determines a data density associated with the display window 308. For instance, the data density system 102 receives a user interaction selecting the option 316 to calculate or determine the data density, whereupon the data density system 102 determines a data density based on the data area occupied by the data elements 322a-322d within the display window 308. Based on determining the data density, the data density system 102 generates and provides a data density indicator 310 for display within a data density tool panel 306.

Additionally, the data density system 102 generates and provides a density recommendation 312. As shown, the density recommendation 312 indicates that "1-6% isn't bad, you could add more if you wanted to." To generate the density recommendation 312, the data density system 102 compares the data density with one or more data density thresholds and selects a recommendation based on the comparison. For example, the data density system 102 selects the density recommendation 312 based on determining that the data density of 6% falls below a particular data density threshold (or within a certain data density range). To determine a data density threshold, in some cases, the data density system 102 determines an application type and/or a function associated with the display window 308 (or a portion function associated with a portion of a display window). Additional detail regarding generating different density recommendations based on different data densities and different thresholds is provided below with reference to FIGS. 4A-4E and FIG. 5. The description of FIGS. 4A-4E relates to different density notifications provided based on comparing different data densities with data density thresholds.

The data density system 102 further generates and provides a density visualization 314 that depicts the data density in a graphical or pictorial format. As shown, the data density system 102 generates the density visualization 314 in the form of a gradient progressing from light to dark (left to right), where lighter shading indicates lower density and darker shading indicates higher density. The data density system 102 provides an arrow, a carat, or some other indication relative to the gradient to illustrate the determined data density (near the left to illustrate a 6% data density).

To determine the data density for the display window 308, the data density system 102 determines a data area associated with the data elements 322a-322d and compares the data area with a display window area of the display window 308 (or a portion area of a portion of a display window). To elaborate, the data density system 102 determines a display window area or a portion area by determining a number of square pixels occupied by the display window 308 (or by a portion of a display window). In some cases, the data density system 102 determines or counts a pixel width and a pixel height for the display window 308 and determines the display window area from the width and height.

In other cases, the data density system 102 queries a display window structure API to obtain the dimensions and/or the area of the display window 308 (or a portion of a display window). Indeed, in certain embodiments, the developer application (e.g., the FIGMA developer application) includes a robust API and/or software development kit (SDK) that facilitates access to various information, including structural components, dimensions, locations, and other attributes for display windows, portions of display windows, and visual elements (data elements and non-data elements) within the display windows. In some implementations, the data density system 102 utilizes the API or SDK to determine various structural components of the display window 308, including dimensions of the display window 308 and/or dimensions of the data elements 322a-322d.

In addition to determining the display window area or the portion area, the data density system 102 determines a data area. Particularly, the data density system 102 determines an area of the display window 308 occupied by the data elements 322a-322d. For example, the data density system 102 queries the display window structure API to determine dimensions or areas associated with the data elements 322a-322d. In other embodiments, the data density system 102 computes or counts the square pixels of the data elements 322a-322d. The data density system 102 further combines the individual area of the data element 322a with that of the data element 322b, the data element 322c, and the data element 322d.

In some embodiments, to determine the data area of a particular data element, such as the data element 322a, the data density system 102 counts each pixel that depicts a portion of a text character or other data item. For instance, the data density system 102 distinguishes between pixels that depict data elements and pixels that do not, and the data density system 102 totals the number of pixels that depict data elements.

In certain embodiments, the data density system 102 determines a width and a height for each character (or other data element) to generate a bounding box that circumscribes or encompasses the data element. For example, the data density system 102 generates bounding boxes for each individual character of a string of characters based on the height and width of the characters. The data density system 102 further combines the areas of the individual bounding boxes for each of the data elements 322a-322d (e.g., for each character) to determine the overall data area within the display. In some cases, to generate a bounding box for one or more characters (or other data elements), the data density system 102 determines the extent of the ligatures of the typography from top to bottom and from left to right, including spacing, leading, and kerning.

The data density system 102 can further determine a data area for data elements other than digital text as well. For example, in some embodiments, the data density system 102 determines data areas for digital images, graphics, icons, or other visual elements that convey meaning to a user. The data density system 102 can detect a data element, determine a coordinate location of corner of the data element (e.g., by querying a display window structure API), determine dimensions of a bounding box encompassing the data element (e.g., by querying a structure API or by analyzing the element to determine its height and width), and determine an area of the data element from the dimensions. In certain cases, the data density system 102 further detects only those pixels within a bounding box that depict the data element and ignores or excludes those that do not, further improving the accuracy of the area determination.

In certain implementations, the data density system 102 determines data density based on data element types. For instance, the data density system 102 determines that text is more difficult to comprehend quickly than images, which are in turn more difficult to comprehend than simple graphics or icons. Thus, the data density system 102 may determine that text data elements have a larger impact on a data density than digital images, which in turn may have a larger impact than simple graphics or icons. In some cases, the data density system 102 utilizes multipliers or weights for different types of data elements, weighting text elements heavier than images which are in turn heavier than graphics or icons. Consequently, given an equal number of text data elements and icon data elements, the data density system 102 can determine a higher data density for the text data elements than for the icon data elements.

In one or more embodiments, the data density system 102 determines a data density for multiple display windows (or portions of one or more display windows) together. For instance, the data density system 102 identifies or detects a set or series of two or more display windows (or portions) that are part of a shared user interface flow, or that work together to accomplish a common function. The data density system 102 further determines a collective data density across the multiple windows (or portions) by comparing a total data area occupied by data elements across them with the total window area (or portion area) of the windows (or portions). In certain cases, the data density system 102 determines an average data density among the display windows (or portions) by determining the data density for each and dividing by the number of display windows (or portions).

Figure 3A:
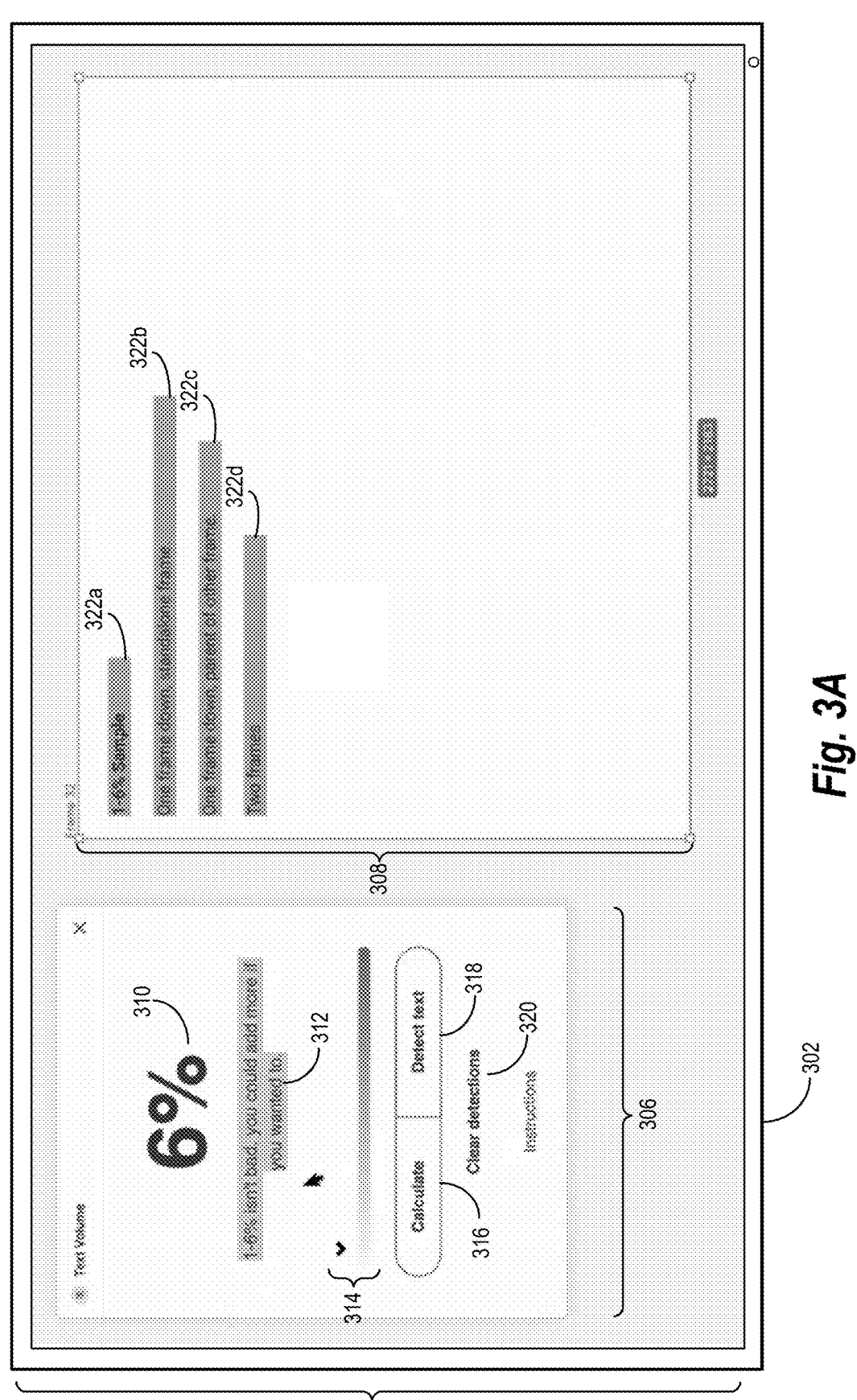
FIG. 3A illustrates an example developer interface for determining data density in accordance with one or more embodiments.

As further illustrated in FIG. 3A, the data density system 102 generates and provides an option 320 to clear detections. For example, the data density system 102 receives a user interaction selecting the option 320, whereupon the data density system 102 clears or forgets the detected data elements within the display window 308. The data density system 102 can further receive user interaction to add, remove, or modify data elements within the display window 308, detect the data elements (in response to user interaction selecting the option 318), and determine an updated data density (in response to user interaction selecting the option 316).

Figure 3B:
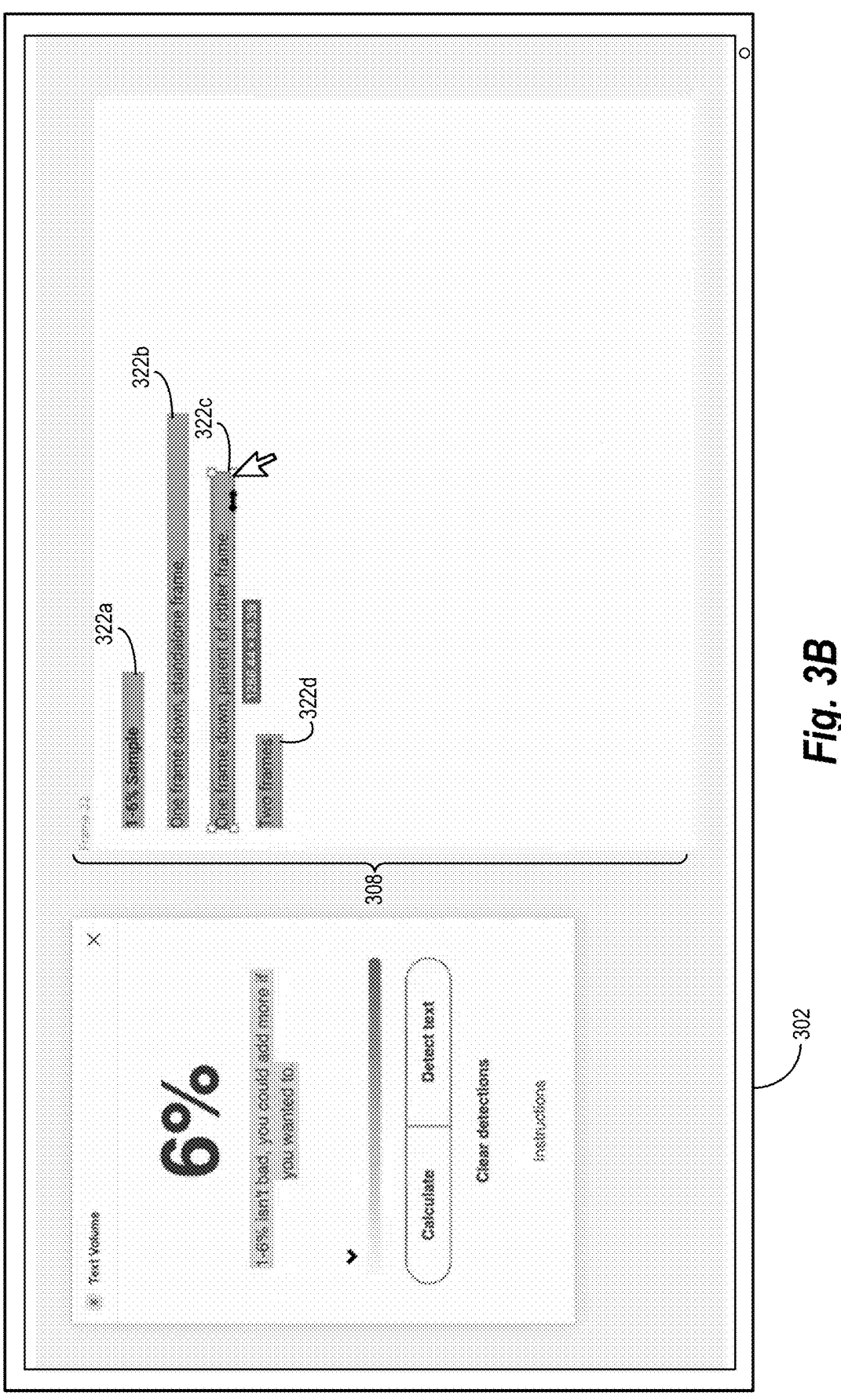
FIG. 3B illustrates an example developer interface for modifying data density in accordance with one or more embodiments.

As shown in FIG. 3A, the data density system 102 depicts bounding boxes (e.g., the gray rectangles around the text characters) that are more general and not necessarily tight to the characters of the data elements 322a-322d (e.g., there is extra space in the bounding boxes). In certain embodiments, the data density system 102 provides developer tools for editing or modifying bounding boxes for improved data density determination. FIG. 3B illustrates an example developer interface displayed in the client device 302 for editing or modifying data elements in accordance with one or more embodiments.

As illustrated in FIG. 3B, the data density system 102 receives user interaction to modify one or more of the data elements 322a-322d. For instance, the data density system 102 receives user interaction to resize bounding boxes for one or more data elements. Indeed, FIG. 3B depicts modified versions of the data elements 322c and 322d. For example, the data density system 102 receives a user interaction to resize the data element 322c by shrinking its bounding box to fit closer to the text characters. As shown, the data element 322d has already been resized to depict a bounding box that more tightly fits the characters of the text.

In some embodiments, the data density system 102 updates or modifies a data density based on modifications to the data elements 322a-322d. For example, the data density system 102 automatically (e.g., without user input specifically instigating) updates or modifies a data density for the display window 308 (or a portion of a display window) based on receiving user interaction to resize the data element 322c. In certain implementations, the data density system 102 updates the data density (and visualizations of the data density) in real time or near real time during (or immediately upon detecting release of) a user interaction to resize a data element. In some cases, the data density system 102 requires further user interaction to clear previous detections, re-detect the data elements, and/or calculate a modified data density.

As mentioned, in certain described embodiments, the data density system 102 generates and provides different density recommendations based on different data densities and other factors, such as an application type and/or a portion function. In particular, the data density system 102 generates and provides indications regarding a data density (e.g., to modify a data density by adding, removing, or modifying one or more data elements) for display within a developer interface as part of developing a computer application. FIGS. 4A-4E illustrate example density notifications or density recommendations based on different data densities (and/or other factors) in accordance with one or more embodiments.

Figure 4A:
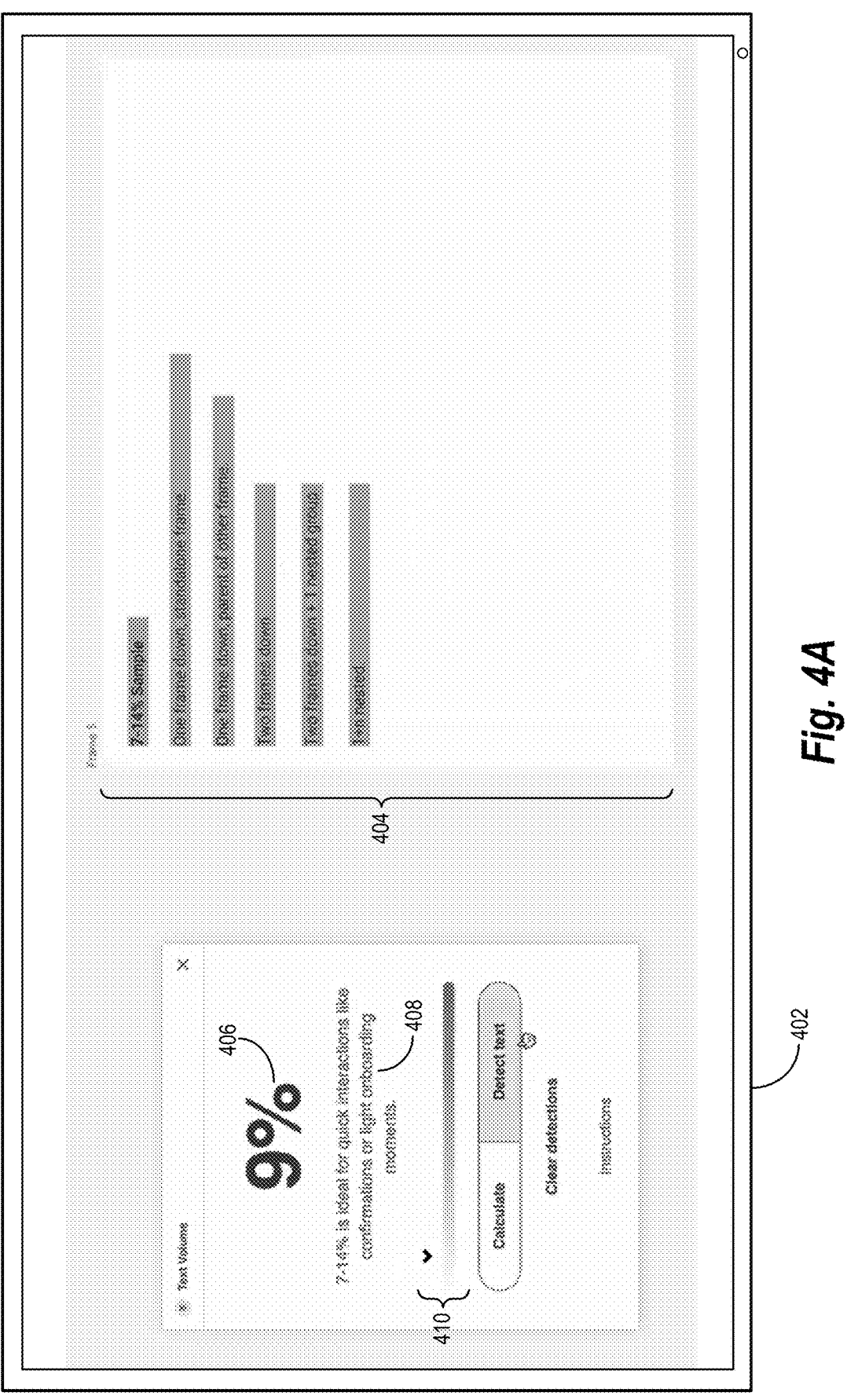
FIGS. 4A-4E illustrate example developer interfaces for generating density notifications for different data densities in accordance with one or more embodiments.

As illustrated in FIG. 4A, the data density system 102 determines a data density for a display window 404 (which may represent a portion of a larger display window) presented within a developer interface on the client device 402 (e.g., the client device 108). As described, the data density system 102 compares a data area of data elements within the display window 404 against an area of the display window 404 (or a portion area). As shown, the data density system 102 determines a data density of 9% where the data elements occupy 9% of the display window area or the portion area, and the data density system 102 provides a density indicator 406 and a density visualization 410 to reflect the data density.

Additionally, the data density system 102 generates a density notification 408 indicating that the data density of 9% falls within a data density range that is ideal for quick interactions like confirmations or light onboarding moments. To elaborate, in some embodiments, the data density system 102 generates the density notification 408 based on determining a data density range associated with the data density. For instance, the data density system 102 compares the data density of 9% with one or more data density thresholds (e.g., thresholds that define different data density ranges that are either universally applicable or that are adaptable based on application type and/or portion function). As shown, the data density system 102 determines that the 9% data density falls between two data density thresholds (or within a data density range) of 7% and 14%.

In some embodiments, data density ranges correspond to (ranges between) different comprehensibility levels, where less dense data is easier to comprehend than more dense data. For instance, the data density range of 7-14% can indicate a high level of comprehensibility, while higher density ranges can indicate lower comprehensibility levels. In some cases, the data density system 102 determines a portion function or display window function for the display window 404 and generates the density notification 408 based on the application type and/or the function, where the application type and/or the function impact the data density thresholds (and therefore the comprehensibility levels) for the display window 404. Indeed, the data density system 102 can determine different application types and/or different functions for different display windows, where display windows for some application types and/or functions may be better fitted for higher data densities than others.

Figure 4B:
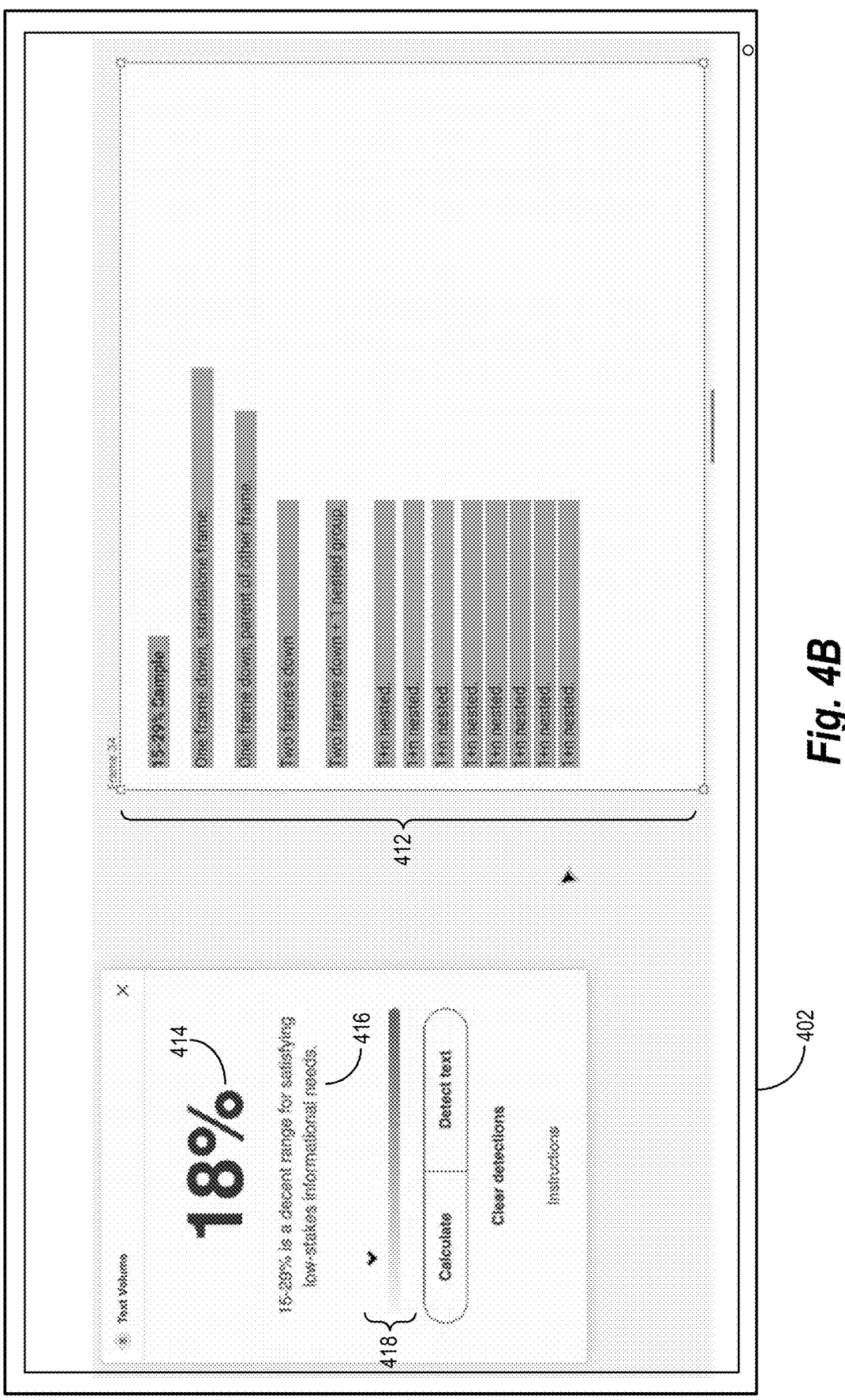

As illustrated in FIG. 4B, the data density system 102 determines a new data density for a new display window 412 presented on the client device 402. For instance, the data density system 102 receives user interaction to select the new display window 412 (or a new portion of a display window) as part of developing or designing the same computer application that includes the display window 404. As indicated by the density indicator 414 and the density visualization 418, the data density system 102 determines a data density of 18% for the display window 412.

In addition, the data density system 102 generates the density notification 416. In particular, the data density system 102 generates the density notification 416 based on determining that the 18% data density is within a particular density range or between two data density thresholds (e.g., above one and below another). In some cases, the data density system 102 compares the data density of the display window 412 with data density thresholds according to an application type and/or a function corresponding to the display window 412. As shown, the density notification 416 indicates that a data density range of 15-29% is a decent range for satisfying low-stakes informational needs (e.g., for certain application types and/or portion functions).

Figure 4C:
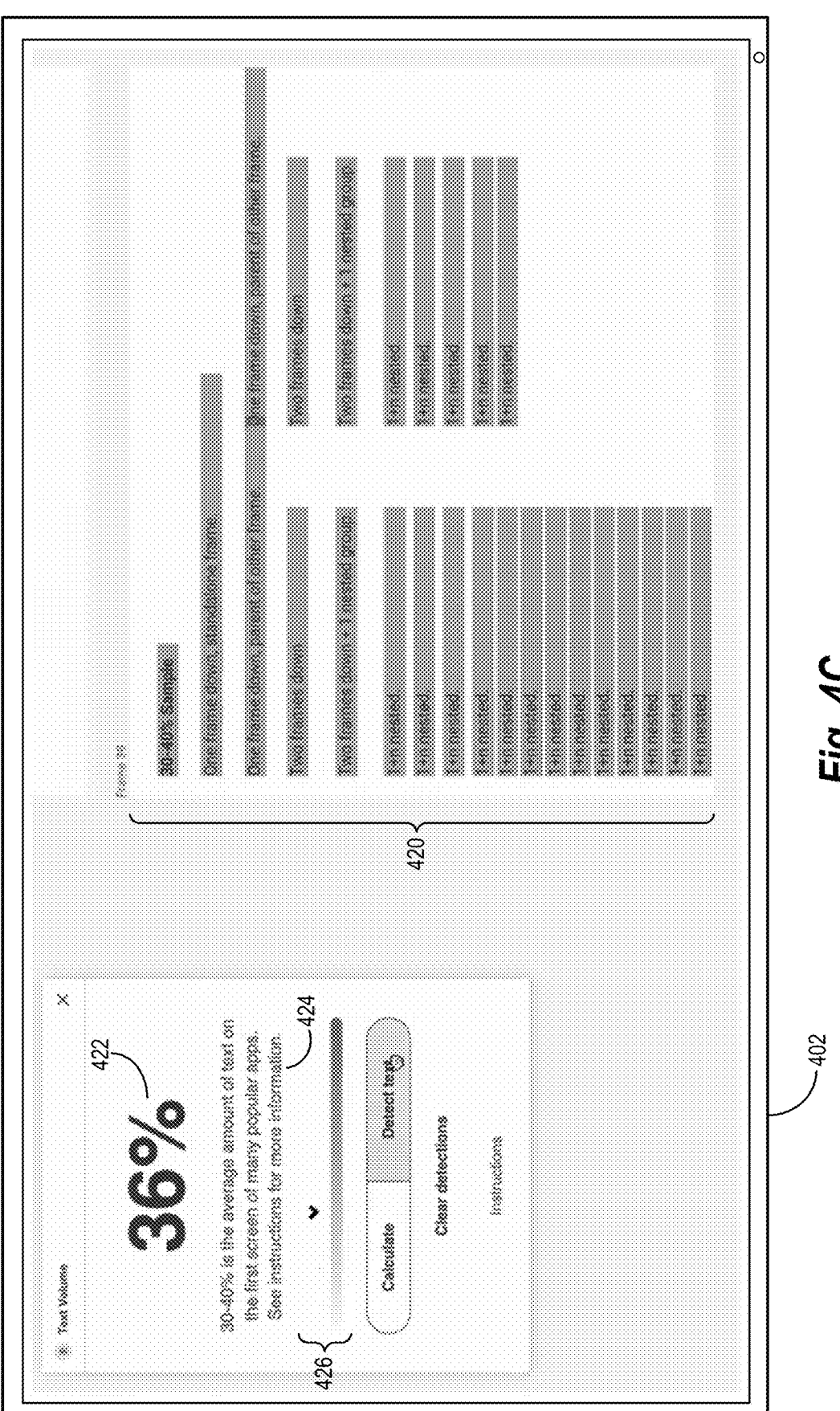

As illustrated in FIG. 4C, the client device 402 displays a developer interface that includes a display window 420 (which may be a portion of a larger display window). In addition, the data density system 102 determines a data density of 36% for the display window 420, as indicated by the density indicator 422 and the density visualization 426. The data density system 102 further generates a density notification 424 based on comparing the 36% density with data density thresholds to determine its data density range or comprehensibility level. As shown, the density notification 424 indicates that 30-40% is the average amount of text (or other data) on the first screen of many popular apps. Thus, the data density system 102 can determine that the data density of the display window 420 is appropriate as an introductory screen for the computer application in development.

Figure 4D:
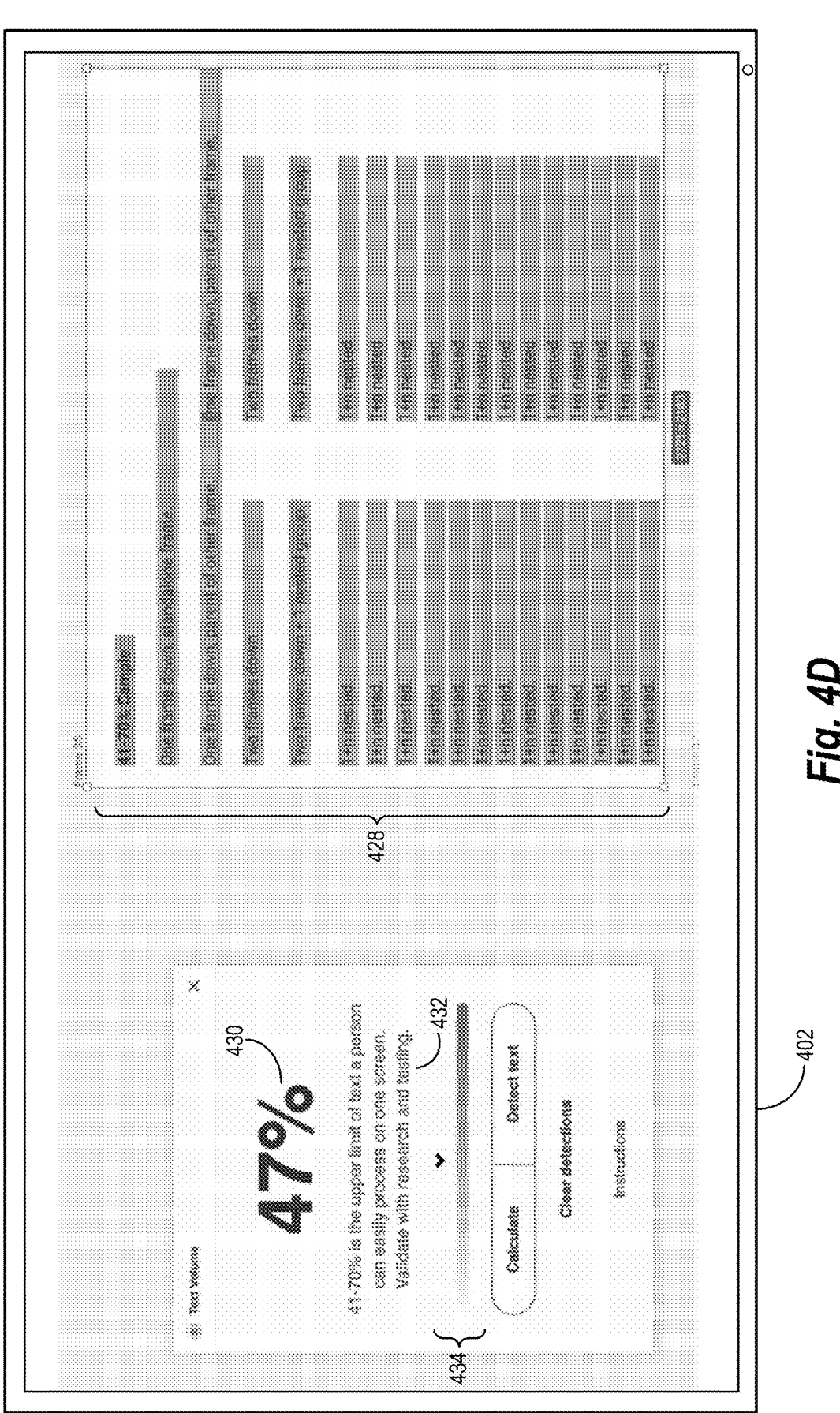

As illustrated in FIG. 4D, the client device 402 presents a display window 428 that has a data density of 47%, as indicated by the density indicator 430 and the density visualization 434. In addition, the data density system 102 generates and provides a density notification 432 based on comparing the 47% data density with one or more data density thresholds to determine a comprehensibility level for the display window 428. As shown, the density notification 432 indicates that 41-70% is the upper limit of text (or other data elements) that a person can easily process on one screen. The data density system 102 further provides a recommendation (as part of the density notification 432) to validate the amount of data within the display window 428 by consulting research and testing.

Figure 4E:
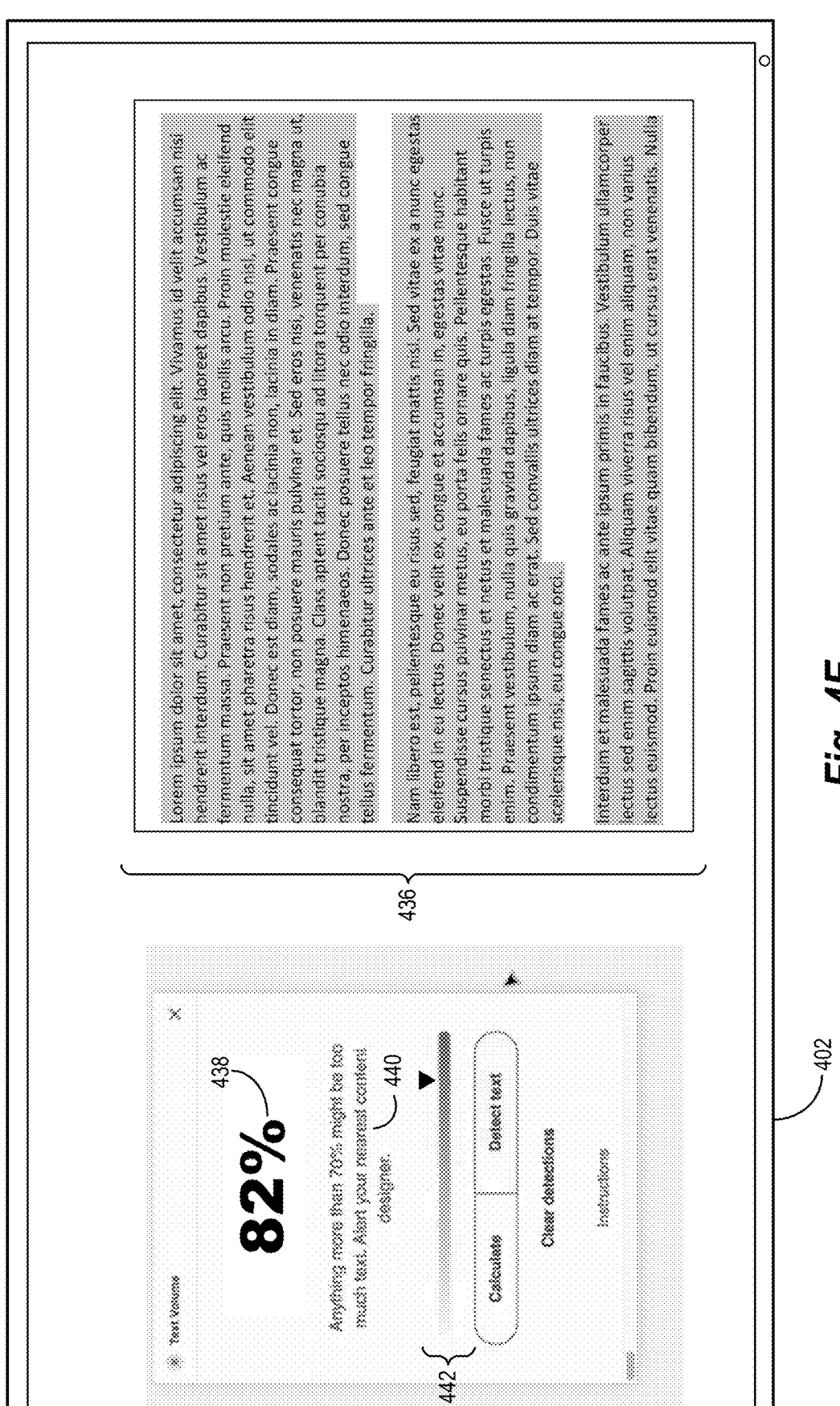

As illustrated in FIG. 4E, the client device 402 presents a display window 436 that has a data density of 82%, as indicated by the density indicator 438 and the density visualization 442. In addition, the data density system 102 generates and provides a density notification 440 based on comparing the 82% data density with one or more data density thresholds to determine a comprehensibility level for the display window 436. As shown, the density notification 440 indicates that anything more than 70% might be too much text (or other data elements) and recommends removing data elements (or alerting the nearest content designer).

Figure 5:
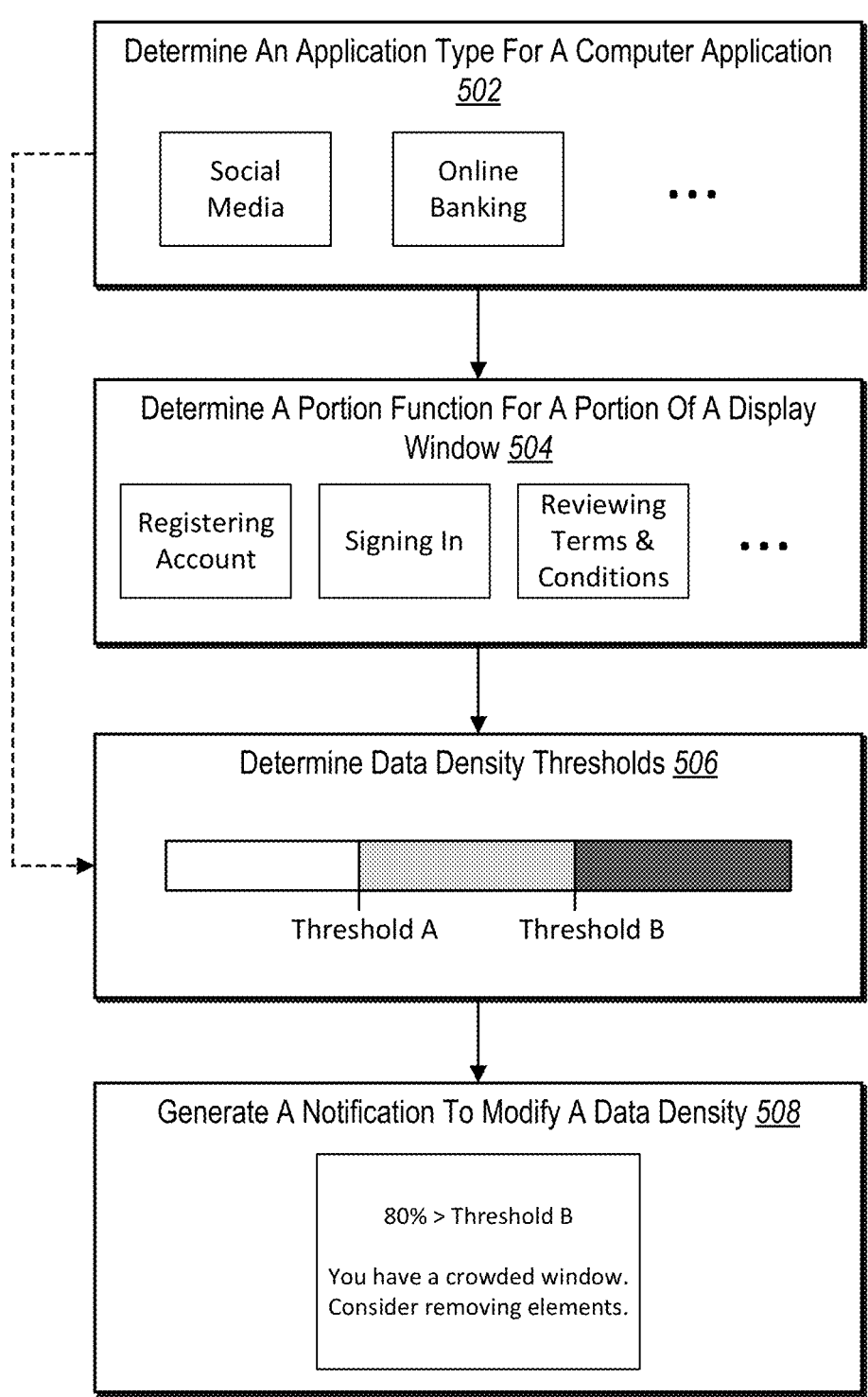
FIG. 5 illustrates an example series of acts for generating a density notification based on an application type and/or a portion function in accordance with one or more embodiments.

As mentioned above, in certain embodiments, the data density system 102 generates density notifications based on determining an application type and/or a portion function for a portion of a display window (or a display window function for a display window). In particular, the data density system 102 generates a density notification based on comparing a data density with application-type-specific data density thresholds and/or portion-function-specific data density thresholds that indicate comprehensibility levels corresponding to different application types and/or portion functions. FIG. 5 illustrates a series of acts for generating a density notification based on an application type and/or a portion function in accordance with one or more embodiments.

As illustrated in FIG. 5, the data density system 102 performs an act 502 to determine an application type for a computer application (e.g., a computer application under development and that includes a given portion of a display window). To elaborate, the data density system 102 determines the application type by analyzing digital content such as visual elements on various display windows included as part of the computer application. Indeed, the data density system 102 can detect common canonical data patterns or value types between applications (or industries or functions). In some embodiments, the data density system 102 performs text analysis to determine a purpose or use case associated with different display windows and further utilizes some intelligence (e.g., a machine learning model) to predict or determine an overall application type based on the determined purposes (or the detected visual elements) of the various display windows (e.g., by classifying the application into one of a set of possible application types). In some cases, the data density system 102 receives a user interaction indicating an application type as part of the application development process (e.g., as a selection from a set of possible application types). As shown, the data density system 102 selects from among a set of possible application types including social media, online banking, and others.

As further illustrated in FIG. 5, the data density system 102 performs an act 504 to determine a portion function for a portion of a display window (in addition or alternatively to determining the application type). In some embodiments, the data density system 102 determines a portion function by analyzing text and/or other visual elements within a portion of a display window. For example, the data density system 102 identifies words or other visual elements and utilizes a machine learning model to generate or predict a portion function from the words or other visual elements included within the portion of the display window (e.g., as a classification into one of a set of possible portion functions). In certain cases, the data density system 102 receives a user interaction indicating a portion function associated with a portion of a display window as part of the application development process (e.g., as a selection from a set of possible portion functions). As shown, the data density system 102 selects from among a set of possible portion functions including registering an account, signing in, reviewing terms and conditions, and others.

Additionally, the data density system 102 performs an act 506 to determine data density thresholds associated with a portion of a display window. More specifically, the data density system 102 determines data density thresholds based on one or more of the application type or the portion function for a portion of a display window. In certain embodiments, the data density system 102 stores preset data density thresholds for each known or stored application type and/or for each known or stored portion function. Thus, upon determining an application type and/or a portion function for a portion of a display window, the data density system 102 identifies the corresponding stored data density thresholds. In some cases, the data density system 102 determines data density thresholds by averaging or otherwise combining preset thresholds to, for example, average a first data density threshold corresponding to an application type and a second data density threshold corresponding to a portion function for a given portion of a display window.

In one or more embodiments, the data density system 102 determines data density thresholds based on other factors such as a location of a portion within a display window and/or a size of the portion. For example, the data density system 102 determines that a portion located centrally within a display window may have a higher tolerance for denser data compared to portions at the edges, so the data density system 102 increases thresholds accordingly. As another example, the data density system 102 determines that smaller portions have a lower tolerance for denser data compared to larger portions, so the data density system 102 decreases thresholds accordingly. The data density system 102 can thus generate or determine data density thresholds based on various factors. As shown, the data density system 102 determines a Threshold A and a Threshold B that delineate three different data density ranges or comprehensibility levels (represented by the lightest shade on the left, the middle shade in the middle, and the darkest shade on the right).

As further illustrated in FIG. 5, the data density system 102 performs an act 508 to generate a notification to modify a data density. In particular, the data density system 102 generates a density notification based on comparing a data density for a portion of a display window with one or more data density thresholds. For example, the data density system 102 generates a density notification indicating a comprehensibility level or density range associated with the portion of the display window (e.g., based on determining that the data density is above one threshold and below another).

In some cases, the data density system 102 generates a density notification based on a determination of whether a display window (or a portion of a display window) requires a quick interaction or a long interaction from a user. For instance, the data density system 102 determines an interaction length based on an application type and/or a portion function associated with a portion of a display window. To elaborate, a portion function for reviewing terms and conditions may require longer interaction than a portion function for signing into a user account. Thus, the data density system 102 can tailor a density notification to recommend modifying data density within a portion of a display window to either increase or decrease the data density based on the portion function (and/or the application type). As shown, the data density system 102 generates a notification indicating that, based on a data density of 80% exceeding Threshold B, the window is crowded and the developer should consider removing elements.

Figure 6:
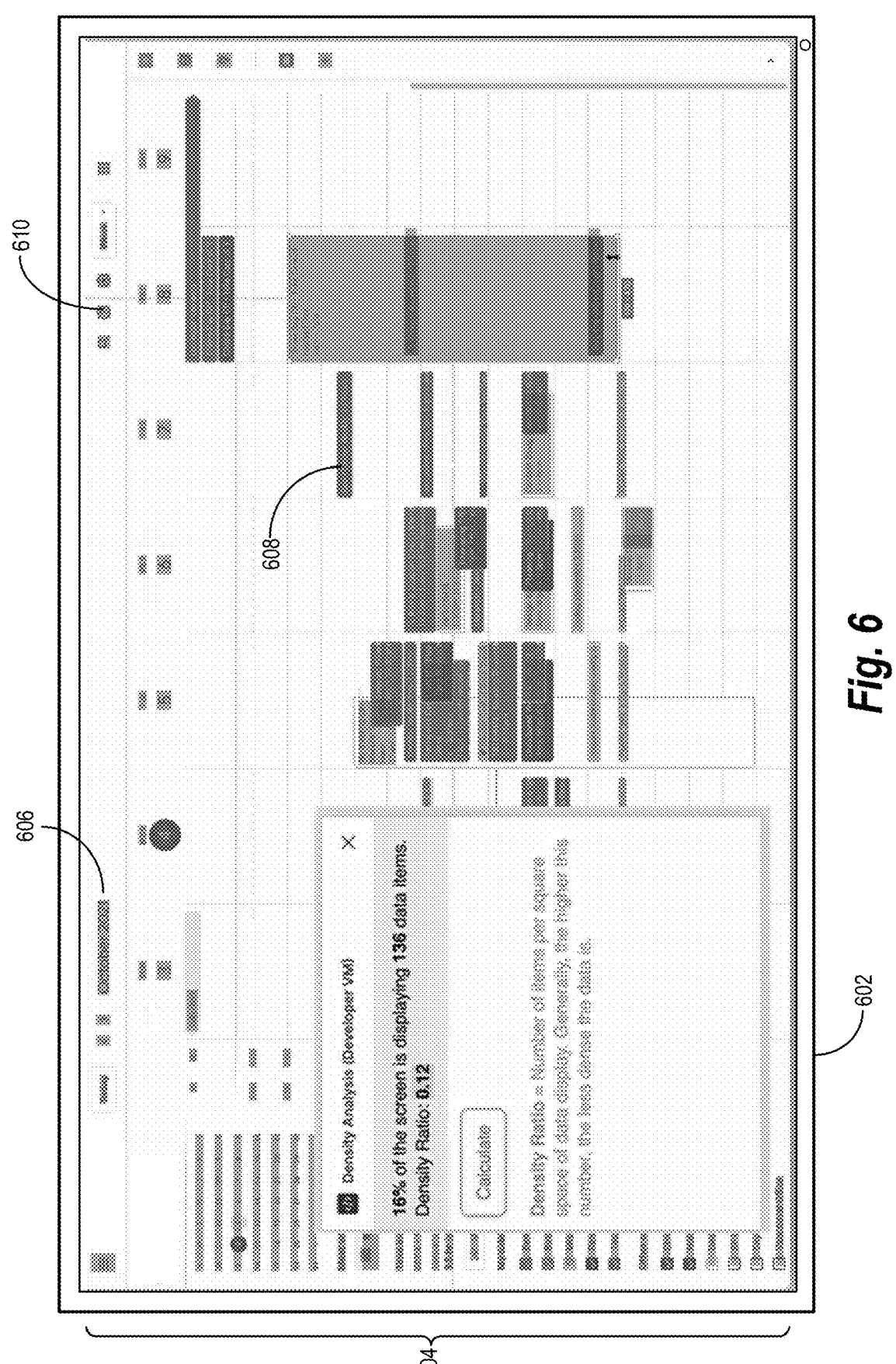
FIG. 6 illustrates an example developer interface for determining different types of data elements in accordance with one or more embodiments.

As mentioned above, in certain described embodiments, the data density system 102 determines a data density based on data elements other than text. In particular, the data density system 102 determines a data density for a portion of a display window that includes digital images, graphics, and icons. FIG. 6 illustrates an example developer interface 604 for determining data density of a digital window (or a portion of a digital window) that includes data elements other than (or in addition to) digital text in accordance with one or more embodiments.

As illustrated in FIG. 6, the client device 602 (e.g., the client device 108) displays a developer interface 604 that includes a display window of a calendar (which may be a portion of a larger display window) as well as a density tool panel ("Density Analysis"). Using the methods and techniques described herein, the data density system 102 analyzes the display window to identify or detect various data elements such as the data elements 606, 608, and 610. As shown, the data density system 102 detects and highlights data elements with bounding boxes of differing shades, including digital text for the data element 606 ("October 2021") or an icon for the data element 610 (the circled "?" symbol).

In some cases, the data density system 102 identifies data elements that overlap one another and/or that include other data elements within them. Specifically, the data density system 102 determines a hierarchical relationship between data elements, where data elements are nested or containerized within other data elements (or within other visual elements). In certain embodiments, the data density system 102 only designates data elements as those elements that do not contain other elements. Indeed, in some embodiments, a data element is the smallest denomination of visualized digital content within a display window, where the data element does not contain any additional visual elements inside it. In other embodiments, as shown in FIG. 6 (where one shaded box overlaps other shaded boxes), the data density system 102 identifies data elements that include other data elements.

In some embodiments, the data density system 102 distinguishes between data elements and non-data elements depicted within the display window. For example, the data density system 102 identifies visual elements within the display window as any digital content items or collections of pixels that portray an object or an observable marking. From the visual elements, the data density system 102 further determines which convey meaning (data elements) and which do not (non-data elements). For instance, as shown in FIG. 6, the data density system 102 determines that the various calendar events, dates, titles, and selectable options convey meaning and are hence data elements. Conversely, the data density system 102 excludes other visual elements (or identifies them as non-data elements) such as the calendar grid, lines indicated breaks between sections of a panel on the left, and/or borders around certain headings or icons.

As shown, the data density system 102 further determines a data density based on comparing the data area of the combined data elements with the area of the display window (or a portion area of a portion of display window). As shown, the data density system 102 determines a data density of 16% for the display area. In some cases, the data density system 102 further determines a data ratio (or a modified version of a data density) for the display window. To elaborate, the data density system 102 determines a data ratio by dividing the data density by the total number of data elements identified within the display window. As shown, the data density system 102 determines a data ratio of 0.12 for the display window.

Figures 7A, 7B:
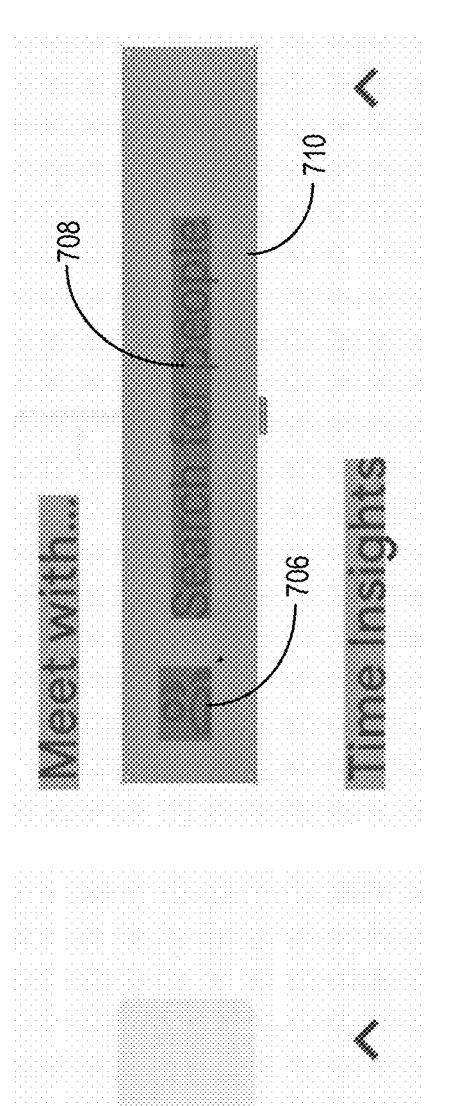
FIGS. 7A-7B illustrates an example hierarchical relationship between data elements in accordance with one or more embodiments.

As mentioned above, in certain described embodiments, the data density system 102 determines data elements that include other data elements. In other embodiments, the data density system 102 determines data elements as visual elements that do not include additional data elements. FIGS. 7A-7B illustrate a comparison between identifying data elements that include other data elements and not identifying data elements that include other data elements in accordance with one or more embodiments.

As illustrated in FIG. 7A, the data density system 102 identifies a number of visual elements 702-710. Using the methods and techniques described herein, the data density system 102 determines that visual elements 702, 704, 706, and 708 are data elements. However, the data density system 102 determines that visual element 710 is not a data element because it contains other data elements.

As illustrated in FIG. 7B, by contrast, the data density system 102 determines, from the same visual elements, that visual element 710 is also a data element. Indeed, the data density system 102 determines that the visual element 710 includes the visual elements 706 and 708, but the visual element 710 nevertheless conveys some level of information (e.g., that the visual element 706 and the visual element 708 are related) and is therefore a data element.

In some embodiments, the data density system 102 determines that a portion of a display window occupies a sub-region of a display window area. For example, the data density system 102 identifies a selection of a sub-portion of a portion of a display window. In addition, the data density system 102 can determine a data area for a subset of data elements occupying the sub-portion or the subregion. The data density system 102 can further determine a data density for the sub-portion or the subregion without necessarily determining a data density for the larger portion or the larger display window as a whole.

Figure 8A:
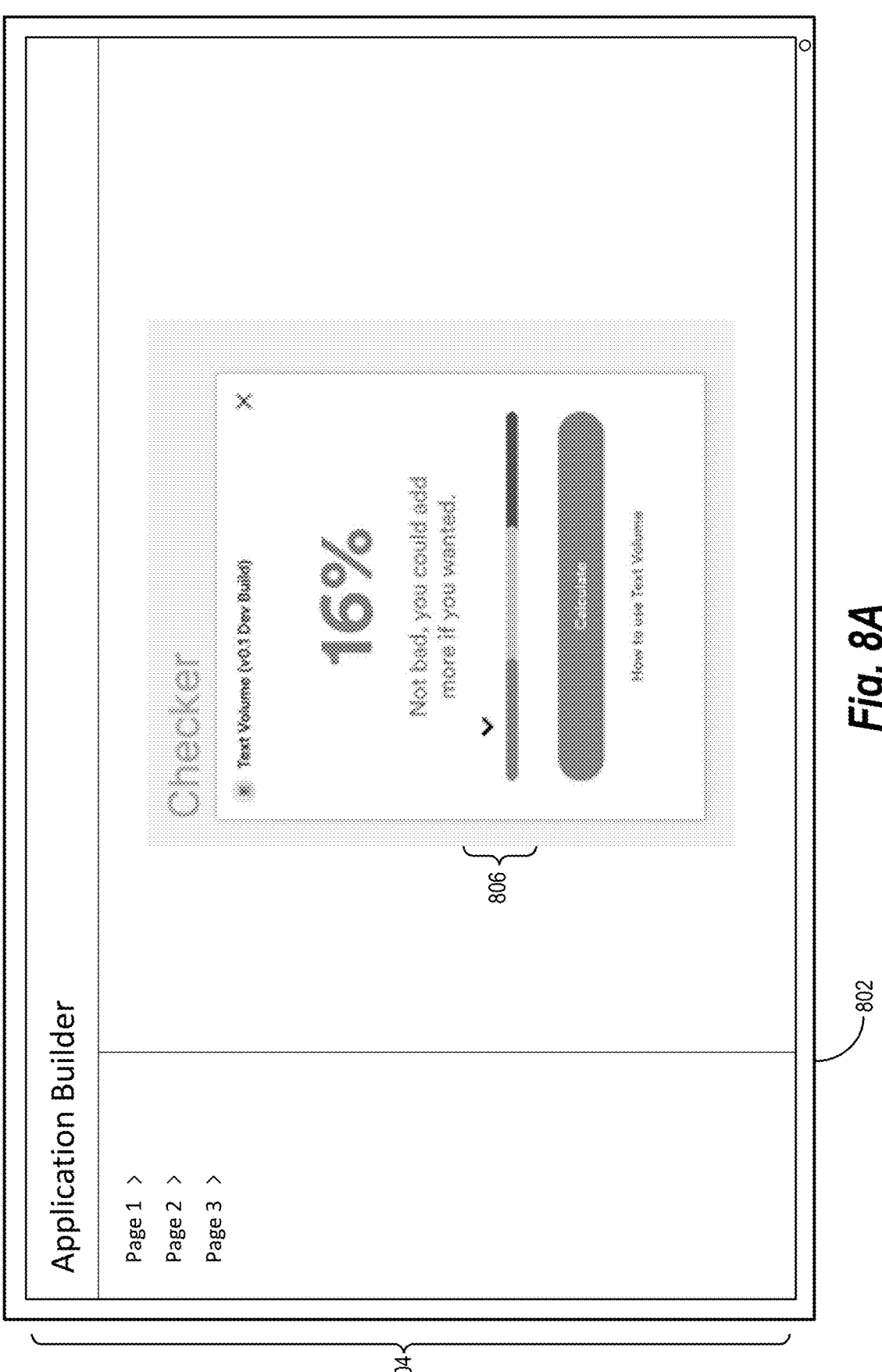
FIGS. 8A-8B illustrate example density visualizations in accordance with one or more embodiments.
Figure 8B:
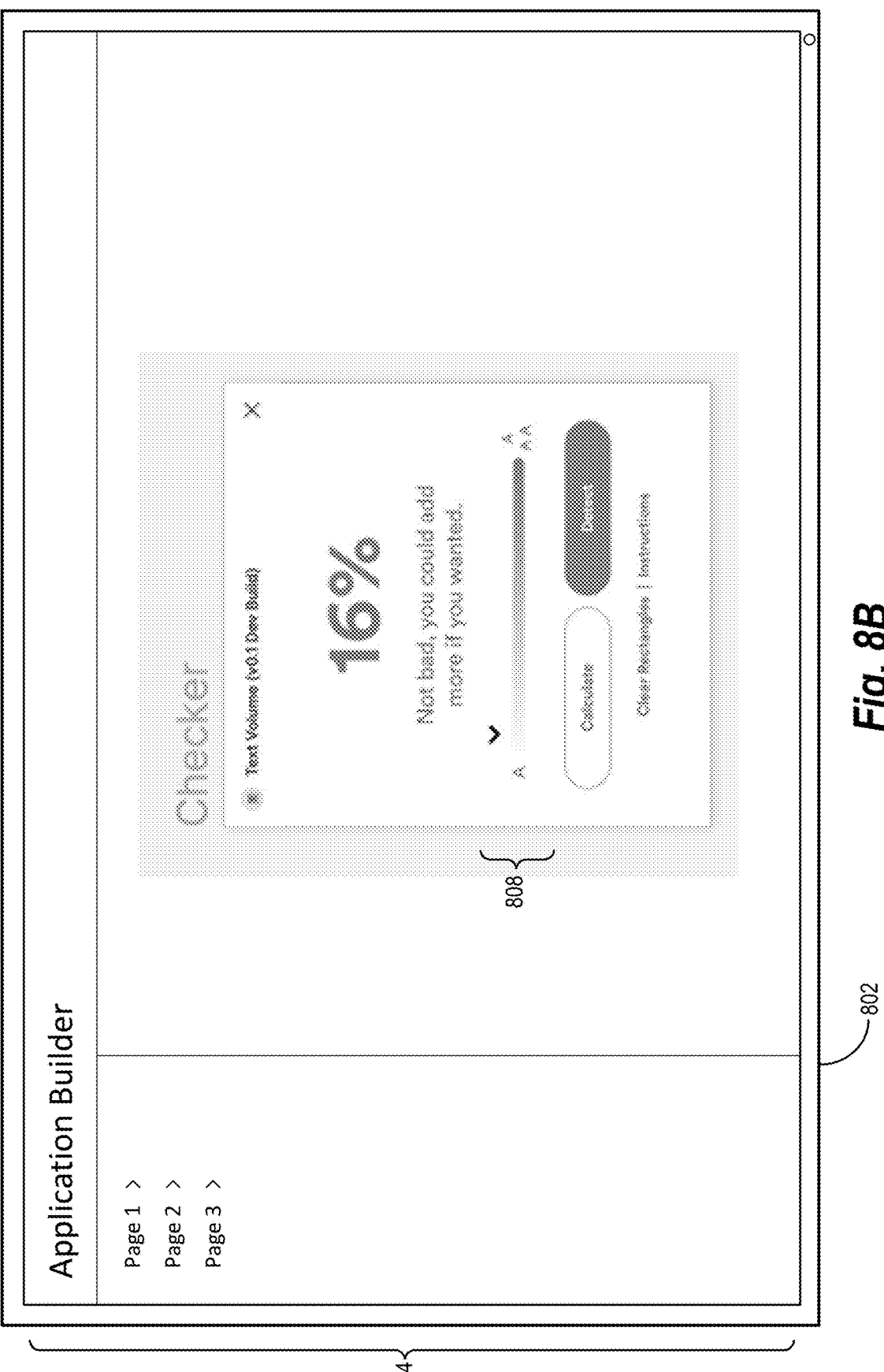

As mentioned above, in certain embodiments, the data density system 102 generates different density visualizations. In particular, the data density system 102 generates numerical, graphical, and/or pictorial visual representations of a data density for display on a client device. FIGS. 8A-8B illustrate example density visualizations in accordance with one or more embodiments.

As illustrated in FIG. 8A, the client device 802 (e.g., the client device 108) displays a developer interface 804 that includes a density visualization 806. In particular, the data density system 102 generates and provides the density visualization 806 to portray the 16% data density relative to three different comprehensibility levels delineated by data density thresholds (as indicated by the three different shades). As shown, the density visualization 806 is in the leftmost comprehensibility level (e.g., on a scale from 0 to 100%).

As illustrated in FIG. 8B, the client device 802 displays the developer interface that includes a density visualization 808. In particular, the data density system generates and provides the density visualization 808 for display. As shown, the density visualization 808 is a gradient that darkens to the right as data density increases (e.g., on a scale from 0 to 100%).

The components of the data density system 102 can include software, hardware, or both. For example, the components of the data density system 102 can include one or more instructions stored on a computer-readable storage medium and executable by processors of one or more computing devices (e.g., the computing device server(s) 106, the client device 108, and/or a third-party device). When executed by the one or more processors, the computer-executable instructions of the data density system 102 can cause a computing device to perform the methods described herein. Alternatively, the components of the data density system 102 can comprise hardware, such as a special purpose processing device to perform a certain function or group of functions. Additionally or alternatively, the components of the data density system 102 can include a combination of computer-executable instructions and hardware.

Furthermore, the components of the data density system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the data density system 102 may be implemented as part of a stand-alone application on a personal computing device or a mobile device. Alternatively or additionally, the components of the data density system 102 may be implemented in any application that allows creation and delivery of marketing content to users, including, but not limited to, various applications.

FIGS. 1-8, the corresponding text, and the examples provide a number of different systems, methods, and non-transitory computer readable media for providing developer tools for determining, and providing visualizations for, data densities for portions of display windows. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
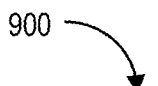
FIG. 9 illustrates an example series of acts for determining, and providing a visualization of, a data density in accordance with one or more embodiments.
Figure 9:
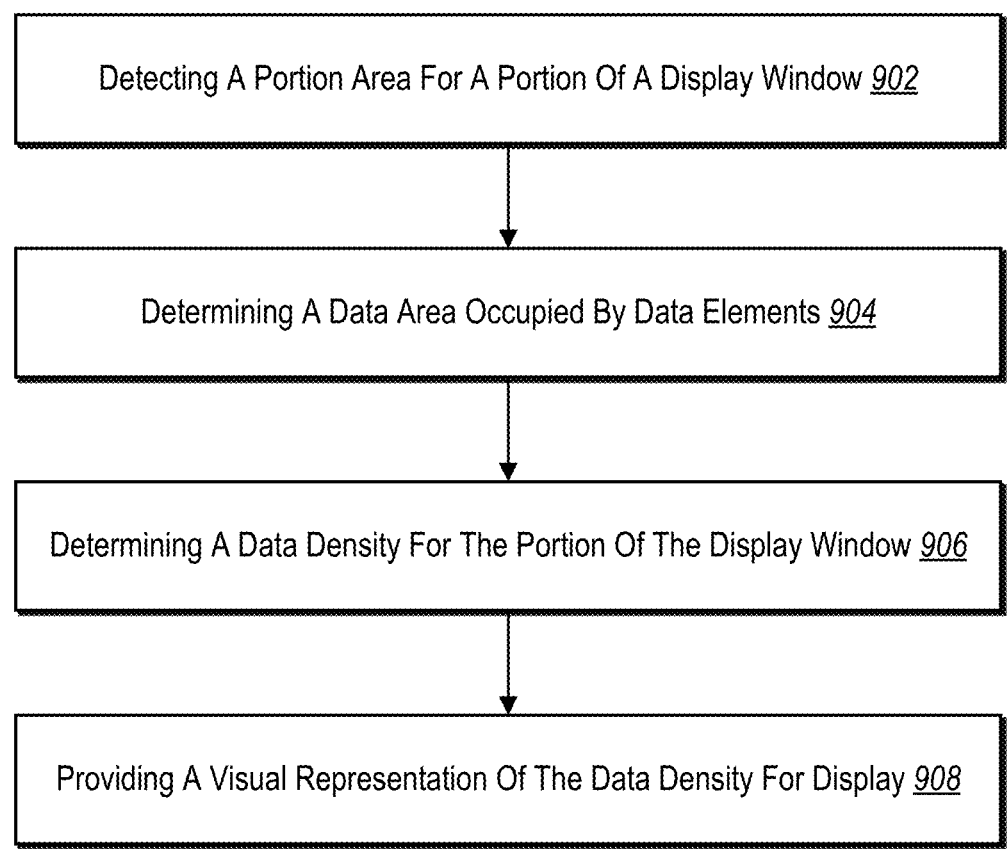

While FIG. 9 illustrates acts according to some embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for determining, and providing visualizations for, data densities for portions of display windows. The series of acts 900 can include an act 902 of detecting a portion area for a portion of a display window. In particular, the act 902 can involve detecting a portion area corresponding to a portion of a display window.

As shown, the series of acts 900 also includes an act 904 of determining a data area occupied by data elements. In particular, the act 904 can involve determining a data area occupied by one or more data elements within the portion of the display window. For example, the 904 can involve determining dimensions for individual boxes that encompass respective data elements of the one or more data elements. The act 904 can also involve determining a combined area for the individual boxes associated with the one or more data elements. In some cases, the act 904 involves querying a display window structure to determine coordinates for the one or more data elements and generating boxes encompassing the one or more data elements based on the coordinates.

Additionally, the series of acts 900 includes an act 906 of determining a data density for the portion of the display window. In particular, the act 906 can involve determining a data density associated with the portion of the display window based on comparing the data area occupied by the one or more data elements and the portion area of the portion of the display window. Comparing the data area occupied by the one or more data elements with the portion area of the portion of the display window can include determining a ratio of the data area to the portion area.

In some cases, the act 906 involves determining a density of text within the portion of the display window. In these or other cases, the act 906 involves determining a percentage of the portion area that is occupied by the one or more data elements and determining an average percentage of the portion area occupied per data element based on the percentage of the portion area occupied by the one or more data elements and a total number of the one or more data elements.

As further illustrated in FIG. 9, the series of acts 900 includes an act 908 of providing a visual representation of the data density for display. In particular, the act 908 can involve providing a visual representation of the data density associated with the portion of the display window for display on a client device. For example, the act 908 can involve providing a visual indication of the data density within a data density scale. The act 908 can involve providing a visual comparison of the data density with one or more data density threshold indicators corresponding to respective data density thresholds.

In some embodiments, the series of acts 900 includes an act of comparing the data density with a data density threshold that delineates between a first comprehensibility level and a second comprehensibility level for the portion of the display window. In these or other embodiments, the series of acts 900 includes an act of determining an application type associated with a computer application executed by the client device to present the display window. The series of acts can also (or alternatively) include an act of generating, for display on the client device, an indication to modify the data density based on the application type.

In certain embodiments, the series of acts 900 includes an act of determining a portion function associated with the portion of the display window. Further, the series of acts 900 can include an act of determining a data density threshold associated with the portion of the display window based on the portion function. Additionally, the series of acts 900 can include an act of generating, for display on the client device, an indication to modify the data density to satisfy the data density threshold. The series of acts 900 can also (or alternatively) include an act of generating, for display on the client device, an indication to modify the data density based on the portion function associated with the portion of the display window.

In some cases, the series of acts 900 includes an act of receiving a user interaction selecting a sub-portion within the portion of the display window. The series of acts 900 can also include an act of, in response to the user interaction, detecting a subset of the one or more data elements within the sub-portion. Further, the series of acts 900 can include an act of determining an additional data density for the sub-portion based on an area occupied by the subset of the one or more data elements. In some cases, the series of acts 900 includes an act of determining that the portion of the display window occupies a subregion of a display window area corresponding to the display window. In these or other cases, the series of acts 900 includes an act of, based on determining that the portion of the display window occupies the subregion, determining the data density associated with the portion of the display window without determining a data density associated with the display window.

The series of act 900 can include an act of receiving a user interaction modifying an area of a data element from among the one or more data elements. Additionally, the series of acts 900 can include an act of determining a modified data density for the portion of the display window based on the user interaction modifying the area of the data element. Further, the series of acts 900 can include an act of modifying the visual representation of the data density to reflect the modified data density. The series of acts 900 can include an act of determining a comprehensibility level associated with the portion of the display window based on the data density.

The series of acts 900 can include an act of receiving a user interaction selecting the portion of the display window. The series of acts 900 can also (or alternatively) include an act of, in response to the user interaction, automatically identifying the one or more data elements within the portion of the display window. Identifying the one or more data elements can include determining a hierarchical structure associated with visual elements depicted within the portion of the display window and identifying, from among the visual elements depicted within the portion of the display window, data elements and non-data elements based on the hierarchical structure.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
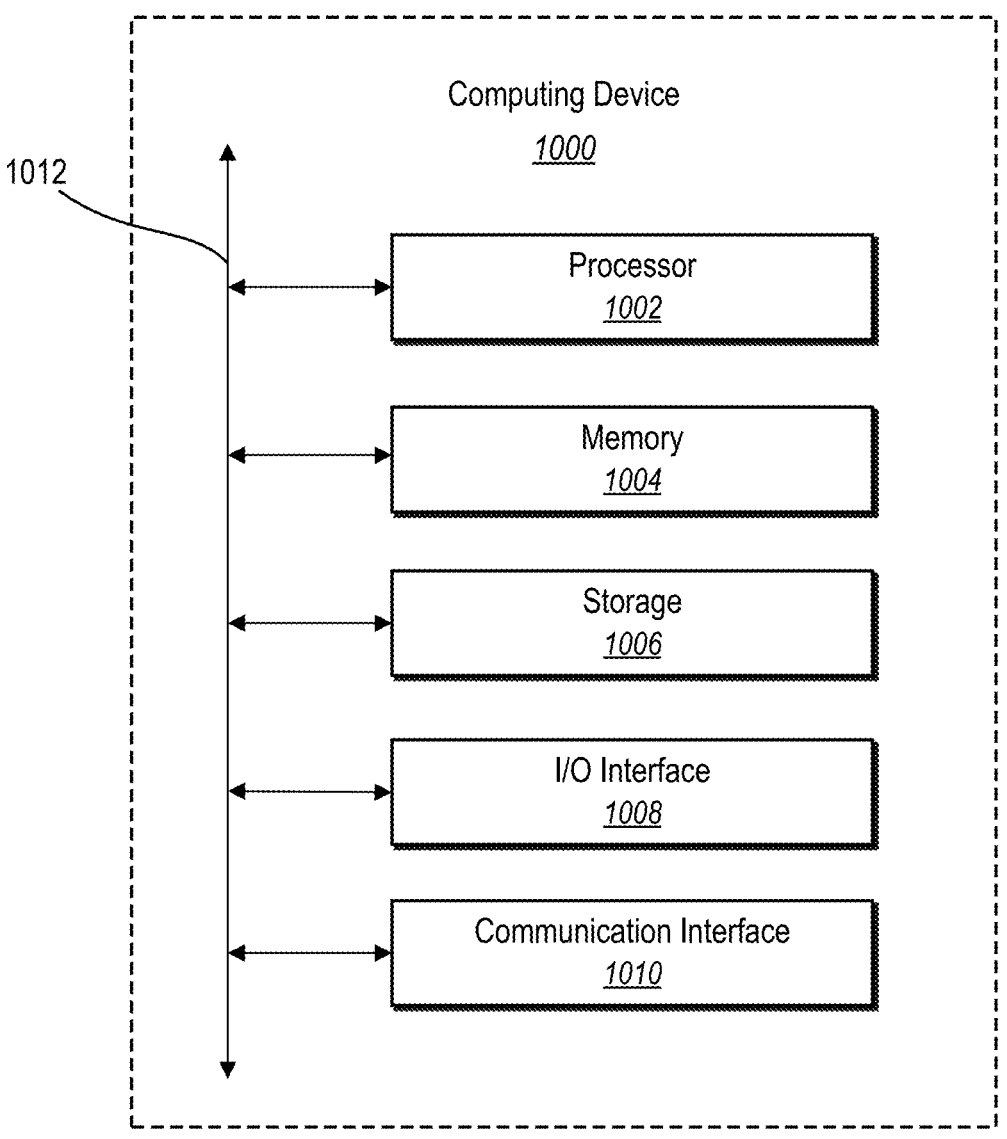
FIG. 10 illustrates a block diagram of a computing device for implementing one or more embodiments of the present disclosure.

FIG. 10 illustrates, in block diagram form, an exemplary computing device 1000 (e.g., the client device 108, or the server(s) 106) that may be configured to perform one or more of the processes described above. As shown by FIG. 10, the computing device can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, storage device 1006 can comprise a non-transitory storage medium described above. The storage device 1006 may include a hard disk drive ("HDD"), flash memory, a Universal Serial Bus ("USB") drive or a combination of these or other storage devices.

The computing device 1000 also includes one or more input or output interface 1008 (or "I/O interface 1008"), which are provided to allow a user (e.g., requester or provider) to provide input to (such as user strokes), receive output from, and otherwise transfer data to and from the computing device 1000. These I/O interface 1008 may include a mouse, keypad or a keyboard, a touch screen, camera, optical scanner, network interface, modem, other known I/O devices or a combination of such I/O interface 1008. The touch screen may be activated with a stylus or a finger.

The I/O interface 1008 may include one or more devices for presenting output to a user, including, but not limited to, a graphics engine, a display (e.g., a display screen), one or more output providers (e.g., display providers), one or more audio speakers, and one or more audio providers. In certain embodiments, interface 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include a bus 1012. The bus 1012 can comprise hardware, software, or both that connects components of computing device 1000 to each other.

Figure 11:
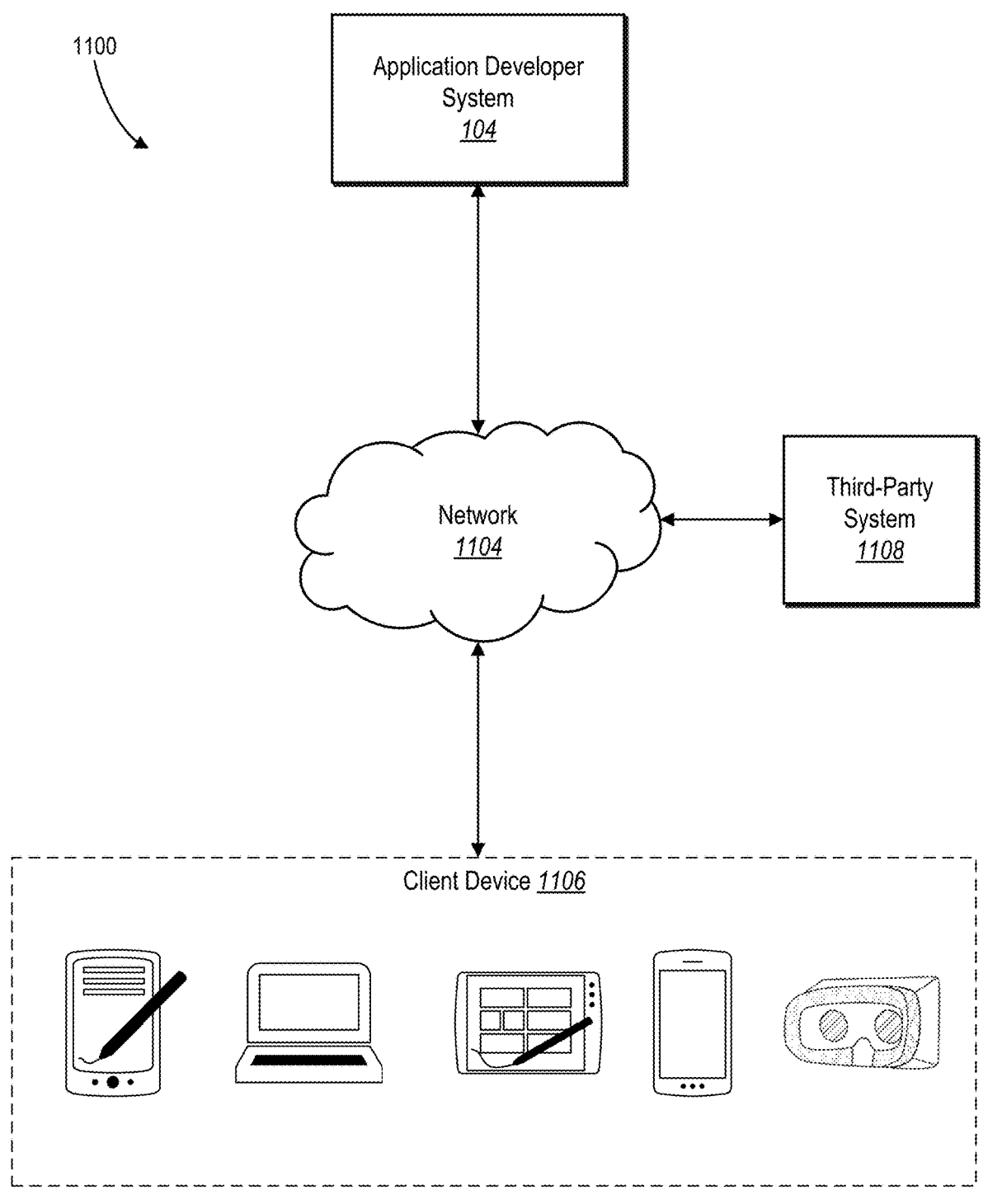
FIG. 11 illustrates an example environment for an application developer system in accordance with one or more embodiments.

FIG. 11 illustrates an example network environment 1100 of the application developer system 104. The network environment 1100 includes a client device 1106 (e.g., client device 108), an application developer system 104, and a third-party system 1108 connected to each other by a network 1104. Although FIG. 11 illustrates a particular arrangement of the client device 1106, the application developer system 104, the third-party system 1108, and the network 1104, this disclosure contemplates any suitable arrangement of client device 1106, the application developer system 104, the third-party system 1108, and the network 1104. As an example, and not by way of limitation, two or more of client device 1106, the application developer system 104, and the third-party system 1108 communicate directly, bypassing network 1104. As another example, two or more of client device 1106, the application developer system 104, and the third-party system 1108 may be physically or logically co-located with each other in whole or in part.

Moreover, although FIG. 11 illustrates a particular number of client devices 1106, application developer systems 104, third-party systems 1108, and networks 1104, this disclosure contemplates any suitable number of client devices 1106, application developer system 104, third-party systems 1108, and networks 1104. As an example, and not by way of limitation, network environment 1100 may include multiple client devices 1106, application developer system 104, third-party systems 1108, and/or networks 1104.

This disclosure contemplates any suitable network 1104. As an example, and not by way of limitation, one or more portions of network 1104 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1104 may include one or more networks 1104.

Links may connect client device 1106, the application developer system 104 (which hosts the data density system 102), and third-party system 1108 to network 1104 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, the client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 10. A client device 1106 may enable a network user at the client device 1106 to access network 1104. A client device 1106 may enable its user to communicate with other users at other client devices 1106.

In particular embodiments, the client device 1106 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 1106 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 1106 one or more Hyper Text Markup Language ("HTML") files responsive to the HTTP request. The client device 1106 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, application developer system 104 may be a network-addressable computing system that can interface between two or more computing networks or servers associated with different entities such as financial institutions (e.g., banks, credit processing systems, ATM systems, or others). In particular, the application developer system 104 can send and receive network communications (e.g., via the network 1104) to link the third-party system 1108. For example, the application developer system 104 may receive authentication credentials from a user to link a third-party system 1108 such as an online banking system to link an online bank account, credit account, debit account, or other financial account to a user account within the application developer system 104. The application developer system 104 can subsequently communicate with the third-party system 1108 to detect or identify balances, transactions, withdrawal, transfers, deposits, credits, debits, or other transaction types associated with the third-party system 1108. The application developer system 104 can further provide the aforementioned or other financial information associated with the third-party system 1108 for display via the client device 1106. In some cases, the application developer system 104 links more than one third-party system 1108, receiving account information for accounts associated with each respective third-party system 1108 and performing operations or transactions between the different systems via authorized network connections.

In particular embodiments, the application developer system 104 may interface between an online banking system and a credit processing system via the network 1104. For example, the application developer system 104 can provide access to a bank account of a third-party system 1108 and linked to a user account within the application developer system 104. Indeed, the application developer system 104 can facilitate access to, and transactions to and from, the bank account of the third-party system 1108 via a client application of the application developer system 104 on the client device 1106. The application developer system 104 can also communicate with a credit processing system, an ATM system, and/or other financial systems (e.g., via the network 1104) to authorize and process credit charges to a credit account, perform ATM transactions, perform transfers (or other transactions) between user accounts or across accounts of different third-party systems 1108, and to present corresponding information via the client device 1106.

In particular embodiments, the application developer system 104 includes a model (e.g., a machine learning model) for approving or denying transactions. For example, the application developer system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the application developer system 104 and/or one or more third-party systems 1108), the application developer system 104 can utilize the transaction approval machine learning model to generate a prediction (e.g., a percentage likelihood) of approval or denial of a transaction (e.g., a withdrawal, a transfer, or a purchase) across one or more networked systems.

The application developer system 104 may be accessed by the other components of network environment 1100 either directly or via network 1104. In particular embodiments, the application developer system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the application developer system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1106, or an application developer system 104 to manage, retrieve, modify, add, or delete, the information stored in data store.

In particular embodiments, the application developer system 104 may provide users with the ability to take actions on various types of items or objects, supported by the application developer system 104. As an example, and not by way of limitation, the items and objects may include financial institution networks for banking, credit processing, or other transactions, to which users of the application developer system 104 may belong, computer-based applications that a user may use, transactions, interactions that a user may perform, or other suitable items or objects. A user may interact with anything that is capable of being represented in the application developer system 104 or by an external system of a third-party system, which is separate from application developer system 104 and coupled to the application developer system 104 via a network 1104.

In particular embodiments, the application developer system 104 may be capable of linking a variety of entities. As an example, and not by way of limitation, the application developer system 104 may enable users to interact with each other or other entities, or to allow users to interact with these entities through an application programming interfaces ("API") or other communication channels.

In particular embodiments, the application developer system 104 may include a variety of servers, sub-systems, programs, modules, logs, and data stores. In particular embodiments, the application developer system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The application developer system 104 may also include suitable components such as network interfaces, security mechanisms, load balancers, failover servers, management-and-network-operations consoles, other suitable components, or any suitable combination thereof. In particular embodiments, the application developer system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the application developer system 104 and one or more client devices 1106. An action logger may be used to receive communications from a web server about a user's actions on or off the application developer system 104. In conjunction with the action log, a third-party-content-object log may be maintained of user exposures to third-party-content objects. A notification controller may provide information regarding content objects to a client device 1106. Information may be pushed to a client device 1106 as notifications, or information may be pulled from client device 1106 responsive to a request received from client device 1106. Authorization servers may be used to enforce one or more privacy settings of the users of the application developer system 104. A privacy setting of a user determines how particular information associated with a user can be shared. The authorization server may allow users to opt in to or opt out of having their actions logged by the application developer system 104 or shared with other systems, such as, for example, by setting appropriate privacy settings. Third-party-content-object stores may be used to store content objects received from third parties. Location stores may be used for storing location information received from client devices 1106 associated with users.

In addition, the third-party system 1108 can include one or more computing devices, servers, or sub-networks associated with internet banks, central banks, commercial banks, retail banks, credit processors, credit issuers, ATM systems, credit unions, loan associates, brokerage firms, linked to the application developer system 104 via the network 1104. A third-party system 1108 can communicate with the application developer system 104 to provide financial information pertaining to balances, transactions, and other information, whereupon the application developer system 104 can provide corresponding information for display via the client device 1106. In particular embodiments, a third-party system 1108 communicates with the application developer system 104 to update account balances, transaction histories, credit usage, and other internal information of the application developer system 104 and/or the third-party system 1108 based on user interaction with the application developer system 104 (e.g., via the client device 1106). Indeed, the application developer system 104 can synchronize information across one or more third-party systems 1108 to reflect accurate account information (e.g., balances, transactions, etc.) across one or more networked systems, including instances where a transaction (e.g., a transfer) from one third-party system 1108 affects another third-party system 1108.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:
1. A system comprising:
at least one processor; and
a non-transitory computer readable medium comprising instructions that, when executed by the at least one processor, cause the system to:
identify a portion area corresponding to a portion of a display window for a computer application, the display window corresponding to a user interface function defining a purpose of the display window in the computer application;
determine, by calculating a number of pixels depicting one or more data elements, a data area occupied by the one or more data elements within the portion of the display window;
determine a data density associated with the portion of the display window based on comparing the data area occupied by the one or more data elements and the portion area of the portion of the display window;
determine a data density threshold based on a comprehensibility level for the display window corresponding to the user interface function;
generate a density recommendation based on the data density threshold and the data density, the density recommendation comprising a notification prompting modification to the one or more data elements occupying the data area for adjusting the data density within the portion of the display window;
provide, for display on a developer interface of a client device, the density recommendation together with a visual representation of the data density associated with the portion of the display window, the developer interface of the client device comprising a developer tool for modifying the data density associated with the portion of the display window; and
in response to a selection of the developer tool for modifying the data density, the system update the data density associated with the portion of the display window according to the density recommendation.

2. The system of claim 1, further comprising instructions that, when executed by the at least one processor, cause the system to determine the user interface function by analyzing text within the portion area.

3. The system of claim 1, further comprising instructions that, when executed by the at least one processor, cause the system to determine the user interface function by analyzing visual elements within the portion area.

4. The system of claim 1, further comprising instructions that, when executed by the at least one processor, cause the system to determine the comprehensibility level from the portion of the display window that corresponds to a portion function defining a purpose for the portion of the display window.

5. The system of claim 1, further comprising instructions that, when executed by the at least one processor, cause the system to:
  determine an application type corresponding to the computer application; and
  determine the user interface function based at least in part on the application type.

6. The system of claim 1, further comprising instructions that, when executed by the at least one processor, cause the system to:
  identify an additional display window for the computer application;
  determine an additional user interface function for the additional display window; and
  generate an additional density recommendation for the additional display window based on the additional user interface function for the additional display window.

7. The system of claim 1, wherein the portion area comprises a sub-portion of the portion of the display window.

8. A computer-implemented method comprising:
  identifying, by utilizing a hardware processor, a portion area corresponding to a portion of a display window for a computer application, the display window corresponding to a user interface function defining a purpose of the display window in the computer application;
  determining, by utilizing the hardware processor, to calculating a number of pixels that depict one or more data elements, a data area occupied by the one or more data elements within the portion of the display window;
  determining, by utilizing the hardware processor, a data density associated with the portion of the display window based on comparing the data area occupied by the one or more data elements and the portion area of the portion of the display window;
  determining, by utilizing the hardware processor, a data density threshold based on a comprehensibility level for the display window corresponding to the user interface function;
  generating, by utilizing the hardware processor, a density recommendation based on the data density threshold and the data density, the density recommendation comprising a notification prompting modification to the one or more data elements occupying the data area for adjusting the data density within the portion of the display window;
  providing, by utilizing the hardware processor, for display on a developer interface of a client device, the density recommendation together with a visual representation of the data density associated with the portion of the display window, the developer interface of the client device comprising a developer tool for modifying the data density associated with the portion of the display window; and
  in response to a selection of the developer tool for modifying the data density, the hardware processor updating the data density associated with the portion of the display window according to the density recommendation.

9. The computer-implemented method of claim 8, further comprising determining, by utilizing the hardware processor, the user interface function by analyzing text within the portion area.

10. The computer-implemented method of claim 8, further comprising determining, by utilizing the hardware processor, the user interface function by analyzing visual elements within the portion area.

11. The computer-implemented method of claim 8, wherein determining the data density threshold comprises determining, by utilizing the hardware processor, the comprehensibility level from the portion of the display window that corresponds to a portion function defining a purpose for the portion of the display window.

12. The computer-implemented method of claim 8, further comprising:
  determining, by utilizing the hardware processor, an application type corresponding to the computer application; and
  determining, by utilizing the hardware processor, the user interface function based at least in part on the application type.

13. The computer-implemented method of claim 8, further comprising:
  identifying, by utilizing the hardware processor, an additional display window for the computer application;
  determining, by utilizing the hardware processor, an additional user interface function for the additional display window; and
  generating, by utilizing the hardware processor, an additional density recommendation for the additional display window based on the additional user interface function for the additional display window.

14. The computer-implemented method of claim 8, wherein identifying the portion area comprises identifying, by utilizing the hardware processor, a sub-portion of the portion of the display window.

15. A non-transitory computer readable medium comprising instructions that, when executed by at least one processor, cause a computing device to:
  identify a portion area corresponding to a portion of a display window for a computer application, the display window corresponding to a user interface function defining a purpose of the display window in the computer application;
  determine, by calculating a number of pixels that depict one or more data elements, a data area occupied by the one or more data elements within the portion of the display window;
  determine a data density associated with the portion of the display window based on comparing the data area occupied by the one or more data elements and the portion area of the portion of the display window;
  determine a data density threshold based on a comprehensibility level for the display window corresponding to the user interface function;
  generate a density recommendation based on the data density threshold and the data density, the density recommendation comprising a notification prompting modification to the one or more data elements occupying the data area for adjusting the data density within the portion of the display window;

provide, for display on a developer interface of a client device, the density recommendation together with a visual representation of the data density associated with the portion of the display window, the developer interface of the client device comprising a developer tool for modifying the data density associated with the portion of the display window; and in response to a selection of the developer tool for modifying the data density, the computing device update the data density associated with the portion of the display window according to the density recommendation.

16. The non-transitory computer readable medium of claim 15, further comprising instructions that, when executed by the at least one processor, cause the computing device to determine the user interface function by analyzing text within the portion area.

17. The non-transitory computer readable medium of claim 15, further comprising instructions that, when executed by the at least one processor, cause the computing device to determine the user interface function by analyzing visual elements within the portion area.

18. The non-transitory computer readable medium of claim 15, further comprising instructions that, when executed by the at least one processor, cause the computing device to determine the comprehensibility level from the portion of the display window that corresponds to a portion function defining a purpose for the portion of the display window.

19. The non-transitory computer readable medium of claim 15, further comprising instructions that, when executed by the at least one processor, cause the computing device to:

determine an application type corresponding to the computer application; and determine the user interface function based at least in part on the application type.

20. The non-transitory computer readable medium of claim 15, further comprising instructions that, when executed by the at least one processor, cause the computing device to:

identify an additional display window for the computer application;

determine an additional user interface function for the additional display window; and generate an additional density recommendation for the additional display window based on the additional user interface function for the additional display window.

* * * * *